US012229868B2

(12) United States Patent
Peterson et al.

(10) Patent No.: US 12,229,868 B2
(45) Date of Patent: Feb. 18, 2025

(54) RAY TRACING IN COMPUTER GRAPHICS USING INTERSECTION TESTING AT SELECTIVE RESOLUTION

(71) Applicant: Imagination Technologies Limited, Kings Langley (GB)

(72) Inventors: Luke T. Peterson, San Francisco, CA (US); James A. McCombe, San Francisco, CA (US); Ryan R. Salsbury, Mountain View, CA (US); Stephen Purcell, Mountain View, CA (US)

(73) Assignee: Imagination Technologies Limited, Kings Langley (GB)

( * ) Notice: Subject to any disclaimer, the term of this patent is extended or adjusted under 35 U.S.C. 154(b) by 419 days.

(21) Appl. No.: 17/004,294

(22) Filed: Aug. 27, 2020

(65) Prior Publication Data

US 2020/0394832 A1    Dec. 17, 2020

Related U.S. Application Data

(63) Continuation of application No. 16/225,273, filed on Dec. 19, 2018, now Pat. No. 10,789,758, which is a (Continued)

(51) Int. Cl.
*G06T 15/06* (2011.01)
*G06T 15/00* (2011.01)
(Continued)

(52) U.S. Cl.
CPC ............ *G06T 15/06* (2013.01); *G06T 15/005* (2013.01); *G06T 15/50* (2013.01); *G06T 15/80* (2013.01)

(58) Field of Classification Search
CPC ......... G06T 15/06; G06T 15/50; G06T 15/80; G06T 15/005
See application file for complete search history.

(56) References Cited

U.S. PATENT DOCUMENTS 5,583,975 A    12/1996  Naka et al.
5,933,146 A    8/1999   Wrigley
(Continued)

OTHER PUBLICATIONS

Lim, M., Aylett, R., My Virtual Graffiti System, Jun. 2004, 2004 IEEE International Conference on Multimedia and Expo, pp. 1-4. (Year: 2004).*

(Continued)

*Primary Examiner* — James A Thompson
(74) *Attorney, Agent, or Firm* — Potomac Law Group, PLLC; Vincent M DeLuca

(57) ABSTRACT

Ray tracing, and more generally, graphics operations taking place in a 3-D scene, involve a plurality of constituent graphics operations. Responsibility for executing these operations can be distributed among different sets of computation units. The sets of computation units each can execute a set of instructions on a parallelized set of input data elements and produce results. These results can be that the data elements can be categorized into different subsets, where each subset requires different processing as a next step. The data elements of these different subsets can be coalesced so that they are contiguous in a results set. The results set can be used to schedule additional computation, and if there are empty locations of a scheduling vector (after accounting for the members of a given subset), then those empty locations can be filled with other data elements that require the same further processing as that subset.

18 Claims, 15 Drawing Sheets

Related U.S. Application Data continuation of application No. 15/496,494, filed on Apr. 25, 2017, now Pat. No. 10,192,350, which is a continuation of application No. 14/558,493, filed on Dec. 2, 2014, now Pat. No. 9,633,468, which is a continuation of application No. 13/959,552, filed on Aug. 5, 2013, now Pat. No. 8,902,230, which is a continuation of application No. 13/525,300, filed on Jun. 16, 2012, now Pat. No. 8,502,820, which is a continuation of application No. 12/941,884, filed on Nov. 8, 2010, now Pat. No. 8,203,559, which is a continuation of application No. 12/408,478, filed on Mar. 20, 2009, now Pat. No. 7,830,379, which is a continuation-in-part of application No. 11/856,612, filed on Sep. 17, 2007, now Pat. No. 7,969,434.

(60) Provisional application No. 61/095,890, filed on Sep. 10, 2008, provisional application No. 61/038,731, filed on Mar. 21, 2008, provisional application No. 60/826,201, filed on Sep. 19, 2006.

(51) Int. Cl.
*G06T 15/50* (2011.01)
*G06T 15/80* (2011.01)

(56) References Cited

U.S. PATENT DOCUMENTS

| | | |
|---|---|---|
| 6,191,789 B1 | 2/2001 | Yamato et al. |
| 6,556,200 B1 | 4/2003 | Pfister et al. |
| 6,597,359 B1 | 7/2003 | Lathrop |
| 7,012,604 B1 | 3/2006 | Christie et al. |
| 7,034,825 B2 | 4/2006 | Stowe et al. |
| 7,289,118 B2 | 10/2007 | Schmittler et al. |
| 2005/0017971 A1* | 1/2005 | Ard ................ G06T 17/10 345/423 |
| 2005/0179686 A1* | 8/2005 | Christensen ........ G06T 15/06 345/423 |
| 2008/0122846 A1* | 5/2008 | Brown ............... G06T 15/06 345/427 |
| 2008/0231633 A1* | 9/2008 | Keller ................ G06T 15/40 345/426 |
| 2009/0096789 A1 | 4/2009 | Peterson et al. |
| 2009/0128552 A1* | 5/2009 | Fujiki ................ G06T 19/006 345/419 |

OTHER PUBLICATIONS

Williams, N., Buxton, B., Buxton, H., Distriouted Ray Tracing Using an SIMD Processor Array, Jul. 1988, Theoretical Foundations of Computer Graphics and CAD, vol. 27, pp. 703-725. (Year: 1988).*

Lim et al., "My Virtual Graffiti System," 2004 IEEE International Conference on Multimedia and Expo (ICME), pp. 847-850 (2004).

Reinhard et al., "Rendering Large Scenes Using Parallel Ray Tracing," Parallel Computing, vol. 23, pp. 873-885 (1997).

Williams et al., "Distributed Ray Tracing Using an SIMD Processor Array," Computer Scient Dep't, Queen Mary College, London, NATO ASI Series, vol. F40, Theoretical Foundations of Computer Graphics and CAD, (1988).

Wald et al., "Interactive Rendering with Coherent Ray Tracing," Eurographics 2001, vol. 20, Sep. 2001, pp. 1-12.

Woop et al., "RPU: A Programmable Ray Processing Unit for Realtime Ray Tracing," ACM Transactions on Graphics, SIGGRAPH '05, vol. 24, No. 3, Jul. 2005, pp. 1-11.

(Note: copies of NPL in parent application).

* cited by examiner

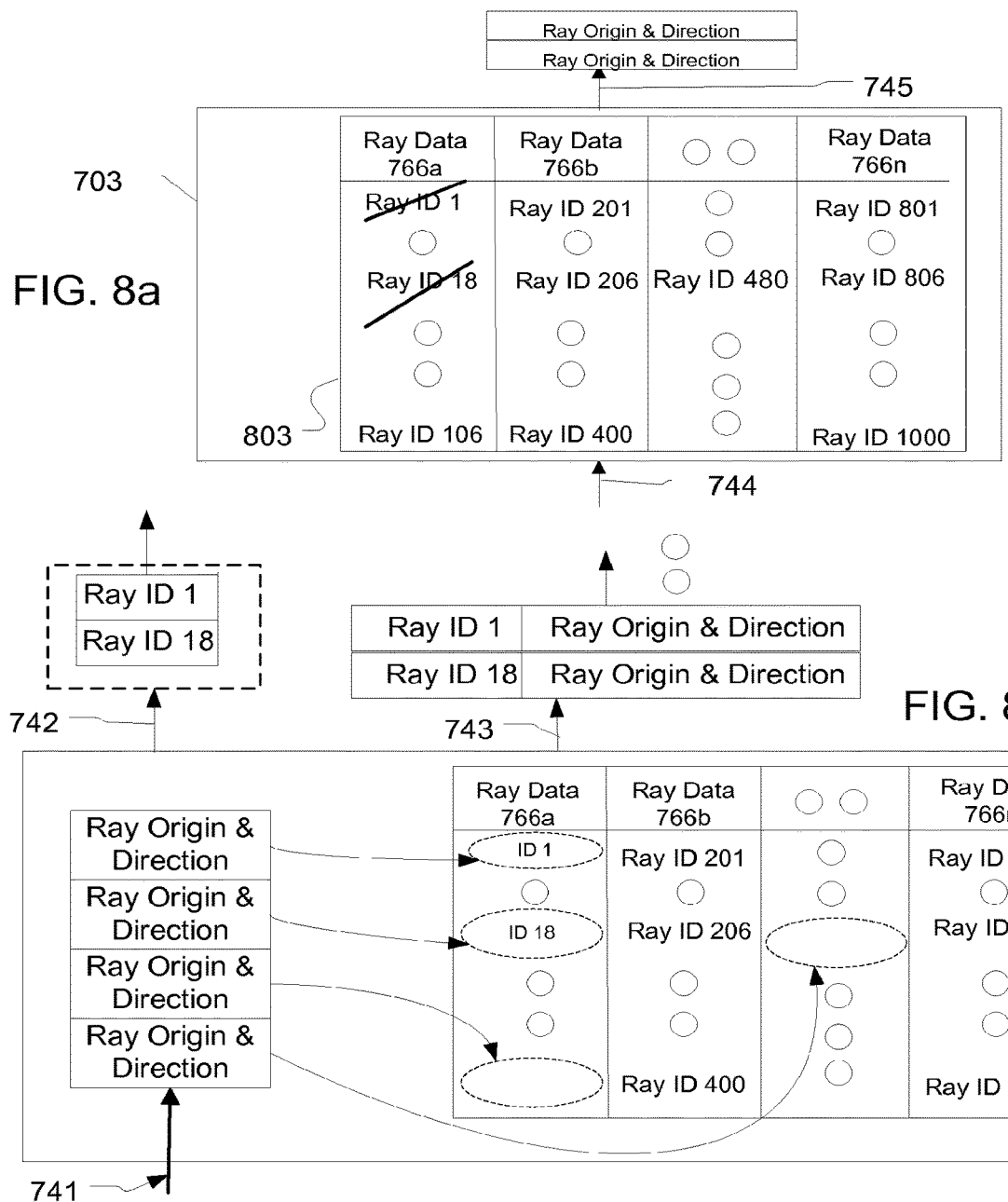
FIG. 8a
FIG. 8b
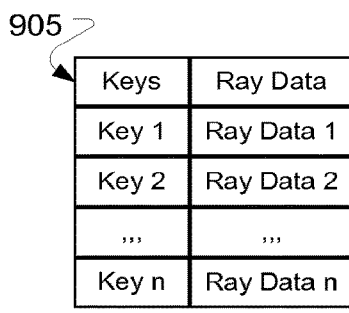
FIG. 9a
FIG. 9b

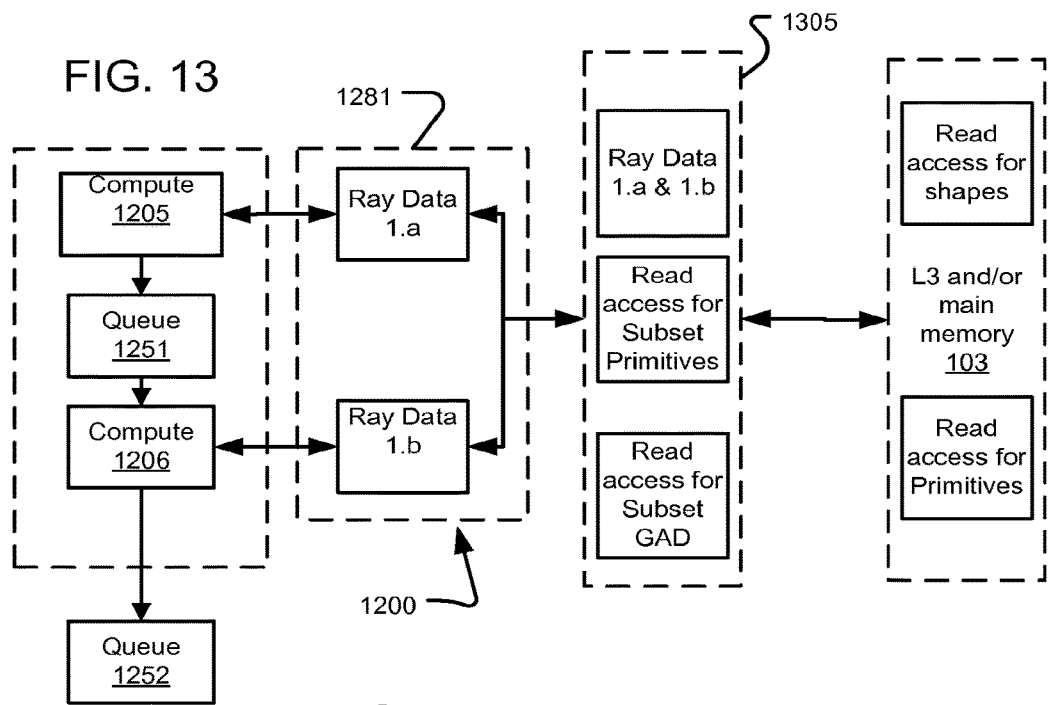
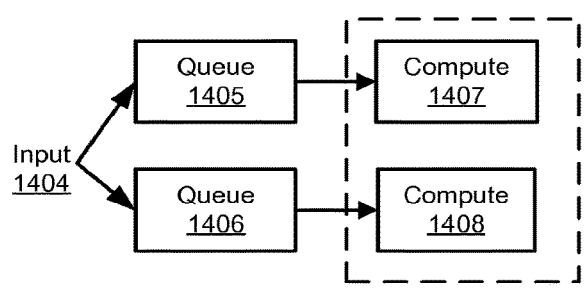
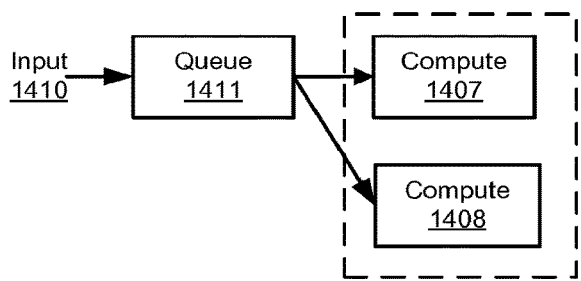
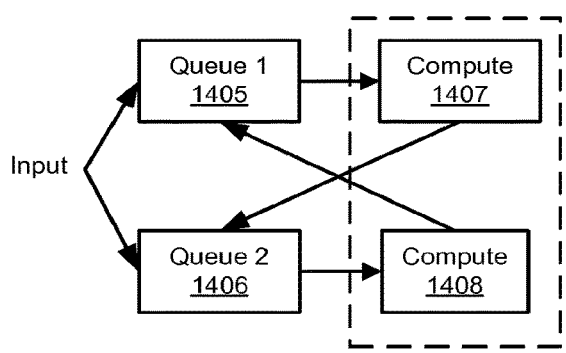
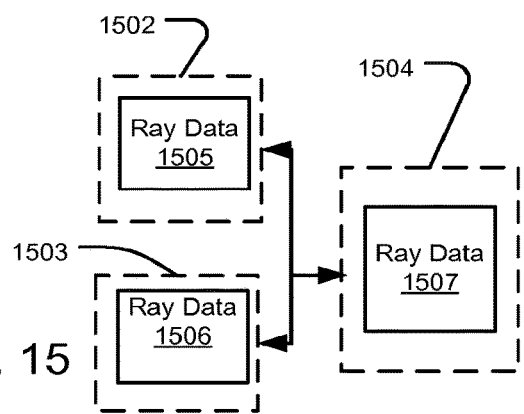

RAY TRACING IN COMPUTER GRAPHICS USING INTERSECTION TESTING AT SELECTIVE RESOLUTION

CROSS REFERENCE TO RELATED APPLICATIONS

This application is a continuation of U.S. application Ser. No. 16/225,273 filed Dec. 19, 2018, which is a continuation of U.S. application Ser. No. 15/496,494 filed on Apr. 25, 2017, now U.S. Pat. No. 10,192,350, which is a continuation of U.S. application Ser. No. 14/558,493 filed Dec. 2, 2014, now U.S. Pat. No. 9,633,468, which is a continuation of U.S. patent application Ser. No. 13/959,952, filed on Aug. 5, 2013, now U.S. Pat. No. 8,902,230, which is a continuation of U.S. patent application Ser. No. 13/525,300, filed on Jun. 16, 2012, now U.S. Pat. No. 8,502,820, which is a continuation of U.S. patent application Ser. No. 12/941,884, filed on Nov. 8, 2010, now U.S. Pat. No. 8,203,559, which is a continuation of U.S. patent application Ser. No. 12/408,478, filed on Mar. 20, 2009, now U.S. Pat. No. 7,830,379, which is a continuation-in-part of U.S. patent application Ser. No. 11/856,612, filed on Sep. 17, 2007, now U.S. Pat. No. 7,969,434, which claims priority under 35 U.S.C. 119 from U.S. Prov. App. No. 60/826,201, filed on Sep. 19, 2006; U.S. patent application Ser. No. 12/408,478 also claims priority from U.S. Prov. App. No. 61/038,731, filed on Mar. 21, 2008, and from U.S. Prov. App. No. 61/095,890, filed on Sep. 10, 2008, all of which are incorporated by reference in their entirety, for all purposes, herein.

BACKGROUND

Field

The present invention generally relates to rendering two-dimension representations from three-dimensional scenes, and more particularly to using ray tracing for accelerated rendering of photo-realistic two-dimensional representations of scenes.

Description of Related Art

Rendering photo-realistic images with ray tracing is well-known in the computer graphics arts. Ray tracing is known to produce photo-realistic images, including realistic shadow and lighting effects, because ray tracing can model the physical behavior of light interacting with elements of a scene. However, ray tracing is also known to be computationally intensive, and at present, even a state of the art graphics workstation requires a substantial amount of time to render a complicated scene using ray tracing.

Ray tracing usually involves obtaining a scene description composed of geometric primitives, such as triangles, that describe surfaces of structures in the scene, and modeling how light interacts with primitives in the scene by tracing light rays, starting from a camera, and through numerous potential interactions with scene objects, until terminating either at light sources, or exiting the scene without intersecting a light source.

For example, a scene may comprise a car on a street with buildings on either side of the street. The car in such a scene may be defined by a large number of triangles (e.g., 1 million triangles) that approximate a continuous surface. A camera position from which the scene is viewed is defined. A ray cast from the camera is often termed a primary ray, while a ray cast from one object to another, for example, to enable reflection is often called a secondary ray. An image plane of a selected resolution (e.g., 1024×768 for an SVGA display) is disposed at a selected position between the camera and the scene.

A simplistic ray tracing algorithm involves casting one or more rays from the camera through each pixel of the image into the scene. Each ray is then tested against each primitive composing the scene to identify a primitive which that ray intersects, then it is determined what effect that primitive has on the ray, for example reflecting and/or refracting it. Such reflection and/or refraction causes the ray to proceed in a different direction, and/or split into multiple secondary rays, which can take different paths. All of these secondary rays are then tested against the scene primitives to determine primitives they intersect, and the process recursively continues until the secondary (and tertiary, etc.) ray terminates by, for example, leaving the scene, or hitting a light source. While all of these ray/primitive intersections are being determined, a tree mapping them is created. After a ray terminates, the contribution of the light source is traced back through the tree to determine its effect on the pixel of the scene. As can be readily understood, the computational complexity of testing 1024×768 (for example) rays for intersection with millions of triangles is computationally expensive—and such ray numbers do not even account for all of the additional rays spawned as a result of material interaction with intersecting rays).

Rendering a scene with ray tracing has been termed an "embarrassingly parallel problem" because color information accumulated for each pixel of an image being produced can be accumulated independently of the other pixels of an image. Thus, although there may be some filtering, interpolation or other processing for pixels prior to outputting a final image, color information for image pixels can be determined in parallel. Therefore, it is easy to segment the task of ray tracing an image on a given set of processing resources by dividing the pixels to be rendered among the processing resources and performing the rendering of those pixels in parallel.

In some cases, the processing resources may be a computing platform that supports multithreading, while other cases may involve a cluster of computers linked over a LAN, or a cluster of compute cores. For these types of systems, a given processing resource, e.g., a thread, can be instantiated for processing an assigned ray or group of rays through completion of intersection testing and shading. In other words, using the property that pixels can be rendered independently of each other, rays known to contribute to different pixels can be divided among threads or processing resources to be intersection tested, and then shade those intersections, writing results of such shading calculations to a screen buffer for processing or display.

Some algorithmic approaches directed at this sort of problem have been proposed. One such approach is disclosed by Matt Pharr, et al. in "Rendering Complex Scenes with Memory-Coherent Ray Tracing" *Proceedings of SigGraph* (1997) ("Pharr" herein). Pharr discloses dividing a scene to be ray traced into geometry voxels, where each geometry voxel is a cube that encloses scene primitives (e.g., triangles). Pharr also discloses superimposing a scheduling grid, where each element of the scheduling grid is a scheduling voxel that can overlap some portion of the geometry voxels (i.e., the scheduling voxel is also a volumetric cube in the scene that can be sized differently than the cubes of the geometry voxels). Each scheduling voxel has an associated ray queue, which includes rays that are currently inside, i.e., these rays are enclosed within, that scheduling voxel, and information about what geometry voxels overlap that scheduling voxel.

Pharr discloses that when a scheduling voxel is processed, the rays in the associated queue are tested for intersection with the primitives in the geometry voxels that are enclosed by the scheduling voxel. If intersection between a ray and a primitive is found, then shading calculations are performed, which can result in spawned rays that are added to the ray queue. If there is no found intersection in that scheduling voxel, the ray is advanced to the next non-empty scheduling voxel and placed in that scheduling voxel's ray queue.

Pharr discloses that an advantage sought by this approach is to help scene geometry to fit within a cache that might normally be provided with a general purpose processor, such that if the scene geometry within each scheduling voxel can fit within a cache then that cache would not thrash much during intersection testing of rays with that scene geometry.

Also, Pharr discloses that by queuing the rays for testing in the scheduling voxel, that when the primitives are fetched into the geometry cache, more work can be performed on them. In situations where multiple scheduling voxels could be processed next, the scheduling algorithm can choose a scheduling voxel which would minimize the amount of geometry that needs to be loaded into the geometry cache.

Pharr recognizes that the proposed regular scheduling grid may not perform well if a particular scene has non-uniform complexity, i.e., a higher density of primitives in some portions of the scene. Pharr hypothesizes that an adaptive data structure, such as an octree could be used in place of the regular scheduling grid. An octree introduces a spatial subdivision in the three-dimensional scene by causing, at each level of the hierarchy, a subdivision along each principal axis (i.e., the x, y, and z axis) of the scene, such that an octree subdivision results in 8 smaller sub-volumes, which can each be divided into 8 smaller sub-volumes, etc. At each sub-volume, a divide/do not divide flag is set which determines whether that sub-volume will be further divided or not. Such sub-volumes are indicated for sub-division until a number of primitives in that sub-volume is low enough for testing. Thus, for an octree, an amount of subdivision can be controlled according to how many primitives are in a particular portion of the scene. As such, the octree allows varying degrees of volumetric subdivision of a volume to be rendered.

A similar approach is disclosed in U.S. Pat. No. 6,556,200 to Pfister ("Pfister"). Pfister also discloses partitioning a scene into a plurality of scheduling blocks. A ray queue is provided for each block, and the rays in each queue are ordered spatially and temporally using a dependency graph. The rays are traced through each of the scheduling blocks according to the order defined in the dependency graph. Pfister references the Pharr paper and adds that Pfister desires to render more than one single type of graphical primitive (e.g., not just a triangle), and to devise more complicated scheduling algorithms for the scheduling blocks. Pfister also contemplates staging sub-portions of scene geometry at multiple caching levels in memory hierarchy.

Yet another approach has been referred to as packet tracing, and a common reference for such packet tracing is "Interactive Rendering through Coherent Ray Tracing" by Ingo Wald, Phillip Slusallek, Carsten Benthin, et al., *Proceedings of EUROGRAPHICS* 2001, pp 153-164, 20(3), Manchester, United Kingdom (September 2001). In this reference, packet tracing involves tracing a packet of rays having similar origins and directions through a grid. The rays emit from a substantially common grid location and travel in a substantially similar direction, such that most of the rays go through common grid locations. Thus, packet tracing requires identifying rays traveling in a similar direction, from a similar origin. Another variation on such packet tracing is to use frustrum rays to bound edges of the packet of rays, such that the frustrum rays are used to determine which voxels are intersected, which helps reduce a number of computations for a given ray packet (i.e., not all rays are tested for intersection, but only those on the outer edges of the packet). Packet tracing still requires identification of rays that originate from a similar place and go in a similar direction. Such rays can be increasingly difficult to identify as rays are reflected, refracted and/or generated during ray tracing.

Still other approaches exist in the area of accelerating ray tracing; one approaches attempts improved cache utilization by more active management of ray state. "Dynamic Ray Scheduling for Improved System Performance" Navratil et al. 2007 IEEE Symposium on Interactive Ray Tracing, (September 2007) (Navratil) references Pharr, describing that Pharr's algorithm has a weakness of "ray state explosion" that causes Pharr to be unsuited for main memory to processor cache traffic. To address this, Navaratil proposes to avoid "ray state explosion" by having limitations designed to "actively manage" ray state and geometry state during ray tracing. One proposal is to separately trace generations of rays, so Navratil discloses tracing primary rays first, and then after finishing primary rays, to trace secondary rays, and so on.

The above background shows the diversity of thought and approach that continues to be prevalent in the area of accelerating ray-tracing based rendering. Also, these references show that further advancements remain in the area of ray tracing. However, discussion of any of these references and techniques is not an admission or an implication that any of these references, or subject matter in them is prior art to any subject matter disclosed in this application. Rather, these references are addressed to help show differences in approaches to rendering with ray tracing. Moreover, treatment of any of these references necessarily is abbreviated for sake of clarity, and is not exhaustive.

SUMMARY

In a first aspect, a method uses a plurality of computing resources in ray tracing a 2-D representation of a 3-D scene. The method comprises using a first subset of computing resources for intersection testing geometric shapes comprising one or more of primitives and geometry acceleration elements with rays traveling in a 3-D scene. Each computing resource of the first subset is operable to communicate with a respective localized memory resource storing a respective subset of the rays traveling in the scene. The method comprises communicating indications of intersections between rays and primitives from the first subset of computing resources to a second subset of computing resources and using the second subset of the computing resources for executing shading routines associated with identified intersections between rays and primitives; outputs from the shading routines comprise new rays to be intersection tested.

The method also comprises distributing data defining the new rays among the localized memory resources and passing groupings of ray identifiers to the computing resources of the first subset with shape data. Each ray identifier comprises data other than ray definition data for that ray. The passing of the ray identifiers activates intersection testing of identified rays with shapes indicated by the shape data. The testing comprises, by each computing resource, retrieving data defining an identified ray stored in its localized memory, testing the indicated shape for intersection based on the retrieved ray definition data and outputting an indication of a detected intersection for communication.

Another aspect comprises a system for rendering, using ray tracing, a 2-D representation of a 3-D scene composed of primitives. The system comprises a plurality of intersection testing resources having access to respective cache memories; the respective cache memories store subsets of a master copy of ray definition data, ray definition data for each ray maintained in the cache memories until testing of that ray has completed.

The system also comprises control logic operable to assign an identifier to each ray and to control testing of each ray by a respective testing resource having access to definition data for that ray in its respective cache memory. The testing control is effected by providing ray identifiers to respective test cells storing data for rays to be tested. The system comprises an output queue for identifying rays that have completed intersection testing and a respective primitive intersected. The control logic assigns new rays resulting from shading calculations to replace rays that have completed intersection testing in the cache memories.

In some aspects, one or more of the following can be provided: the control logic provides for the replacement by reusing identifiers for completed rays as identifiers for new rays, ray identifiers relate to memory locations storing respective data defining that ray, and data defining new rays replaces data stored in memory locations of completed rays.

Still other aspects comprise a system for rendering, using ray tracing, a 2-D representation of a 3-D scene composed of primitives. The system comprises a memory storing primitives composing a 3-D scene and a plurality of intersection testing resources. Each intersection testing resource is operable to test at least one ray traveling in the scene with at least one of the primitives, and output an indication of a detected intersection. The system also comprises a plurality of shader resources, each operable to run a shading routine associated with a primitive from an indication of a detected ray/primitive intersection. The system also comprises a first communication link for outputting indications of detected intersections to the shader resources and a second communication link for sending, to the intersection testing resources, new rays resulting from running of the shading routines, wherein new rays can be sent to the intersection testing resources and complete intersection testing different from a relative order in which they were sent. The communications links can be implemented as queues, such as FIFO queues.

Still further aspects include a method of ray tracing a scene composed of primitives in a system having a plurality of compute resources coupled to a hierarchical memory structure comprising a main memory and memories distributed among the compute resources, where the main memory is higher in latency than the distributed memories. The method comprises distributing data defining rays to be intersection tested in the scene among the distributed memories, such that subsets of the rays are stored in different ones of the distributed memories, and determining to intersection test a group of the rays, where members of the group are stored in multiple of the distributed memories, with one or more geometric shapes. The method comprises fetching data defining the one or more geometric shapes from the main memory, and providing the geometric shape and identifiers for rays of the group to at least one compute resource associated with each distributed memory storing data for a ray of the group. The method also comprises testing each ray of the group for intersection with a compute resource associated with at least one of the distributed memories storing data for that ray; and collecting intersection testing results from the compute resources.

Still further aspects include a system for intersection testing rays with primitives composing a 3-D scene. The system comprises a plurality of intersection test resources, each operable for testing a respective ray for intersection with a geometric shape. Each respective ray is indicated by a reference provided to each intersection test resource, and the test resources are operable for outputting, to either a first output or a second output, an indication of an intersection between the ray and the geometric shape.

One output is for primitive intersections and the other output is for geometry acceleration element intersections. For example, the first output can provide input to the plurality of shading resources, and be for indications of intersections between rays and primitives, while the second output provides input to the ray collection manager and receives indications of intersections between rays and geometry acceleration elements.

Still further aspects include a ray tracing method that comprises storing primitives composing the 3-D representation and geometry acceleration elements respectively bounding selections of the primitives in a main memory resource, defining rays to be intersection tested in the scene, and defining an identifier for each of the rays. The method comprises, in a system comprising a plurality of separately programmable processing resources, storing portions of the ray origin and direction data in localized memory resources respectively associated with each of the processing resources. The method also comprises implementing scheduling of rays for intersection testing by providing identifiers for the rays scheduled for test, and an indication of a geometric shape to the processing resources. Each processing resource determines whether its localized memory resource stores ray definition data for any of the identified rays, and if so then testing those rays for intersection with the indicated geometric shape.

Still other aspects include a computer readable medium/media comprising machine readable instructions for a system for controlling a plurality of processing resources to accomplish intersection testing of geometric shapes with rays for use in rendering a 2-D representation of a 3-D scene. The instructions are for implementing a method that comprises accessing a packet of identifiers for rays determined to have intersected a first geometry acceleration element bounding a first selection of primitives, and determining other geometry acceleration elements that bound portions of the primitives bounded by the first geometry acceleration element. The method also comprises instantiating a plurality of packets, each containing the ray identifiers, and a respective indication of a different one of the other geometry acceleration elements, and providing the plurality of packets to each of a plurality of computing resources respectively configured for intersection testing of fewer than all the rays identified in each packet. The method also comprises receiving indications of intersections detected from the plurality of computing resources; and tracking the received indications by a geometry acceleration element until identifying a next geometry acceleration element having more than a threshold number of received indications and repeating the accessing with a next packet.

Still further aspects include a ray tracing system comprising a plurality of computing resources configured for intersection testing a shape with a ray and respective caches coupled with each of the computing resources, where each of the caches stores data defining some of a plurality of rays traveling in the scene; and channels for passing messages among the plurality of computing resources, wherein each of the computing resources is configured for interpreting data in a message received by it as containing a plurality of ray identifiers, for determining whether its cache has any of the plurality of rays stored in it, and to test any stored rays with an associated shape.

Still further aspects include a system for intersection testing rays with primitives composing a 3-D scene. The system comprises a plurality of intersection test resources, each operable for testing a respective ray for intersection with a geometric shape. The respective ray is indicated by a reference provided to each intersection test resource. Each intersection testing resource also is configured for outputting, to either a first output or a second output, an indication of an intersection between the ray and the primitive. The system further comprises a plurality of shading resources, each operable for executing shading code for detected intersections, and a ray collection manager operable for maintaining references to rays and for providing the ray references to the plurality of intersection test resources for indicating rays to be tested. The first output provides input to the plurality of shading resources, and receives indications of intersections between rays and primitives, and the second output provides input to the ray collection manager and receives indications of intersections between rays and geometry acceleration elements.

Still further aspects comprise a computing configuration for use in parallel ray tracing-based rendering of a 2-D representation of a 3-D scene, comprising: a processor coupled to a local cache, the local cache configured to store data defining a plurality of rays to be tested for intersection with specified geometric shapes; and an input queue serviced by the processor, data received in the input queue interpretable by the processor as comprising a plurality of identifiers for rays to be tested for intersection with an indicated geometric shape, the processor configured to retrieve definition data only for any ray identified in its queue for which there is data stored in the processor's local cache, to intersection test any such rays with the indicated geometric shape, and to output indications of any detected intersections.

Still further aspects include a computer readable medium comprising machine readable instructions for implementing a ray tracing method comprising accessing a packet of identifiers for rays determined to have intersected a geometry acceleration element bounding a selection of primitives and determining other geometry acceleration elements that bound portions of the primitives bounded by the intersected geometry acceleration element. The method also comprises instantiating a plurality of packets, each containing the ray identifiers, and a respective indication of a different one of the other geometry acceleration elements and providing the plurality of packets to each of a plurality of computing resources respectively configured for intersection testing of rays identified in each packet. The method also comprises receiving indications of intersections detected from the plurality of computing resources; and tracking the received indications according to a geometry acceleration element.

Still further aspects comprise a method of ray tracing, which comprises determining ray definition data defining a plurality of rays to be tested for intersection with primitives composing a 3-D scene. The method also comprises distributing subsets of the ray definition data among respective local memories of a plurality of computing resources, the computing resources configured for intersection testing rays with geometric shapes and in a management module, determining collections of rays from the plurality to be intersection tested by the computing resources. The collections are defined by a plurality of ray identifiers, each comprising data other than definition data for the ray, and associated with a bounding shape bounding portions of the primitives. The method also comprises causing the computing resources to test rays of a determined collection by passing ray identifiers for that collection among the computing resources, to which each computing resource respectively is responsive by intersection testing identified rays for which definition data is stored in the local memory for that computing resource.

In any such aspects, the plurality of rays stored in the local cache can be a disjoint subset of a second plurality of rays, and some of the plurality of ray identifiers identify rays stored in the local cache and some rays of the second plurality are not stored in the local cache.

The functional aspects described can be implemented as modules, such as modules of computer executable code, configuring appropriate hardware resources operable to produce inputs and outputs as described.

BRIEF DESCRIPTION OF THE DRAWINGS

For a fuller understanding of aspects and examples disclosed herein, reference is made to the accompanying drawings in the following description.

FIGS. 8a and 8b illustrate aspects of providing identifiers for rays that can be used in controlling ray tracing in systems according to FIGS. 1-7;

FIGS. 9a and 9b illustrate examples of using ray IDs to identify ray data in memories that can be provided for intersection testing resources of any of FIGS. 1-7;

FIG. 13 illustrates an example of multiple threads or cores operating as a portion of the computing resources of FIG. 12;

FIGS. 14a-14c illustrate different queuing implementations useful for systems and architectures according to FIGS. 1-13;

FIG. 15 is used to illustrate different ways that ray data can be distributed among private L1 caches from an L2 cache shared by plural computing resources;

DETAILED DESCRIPTION

Figure 1:
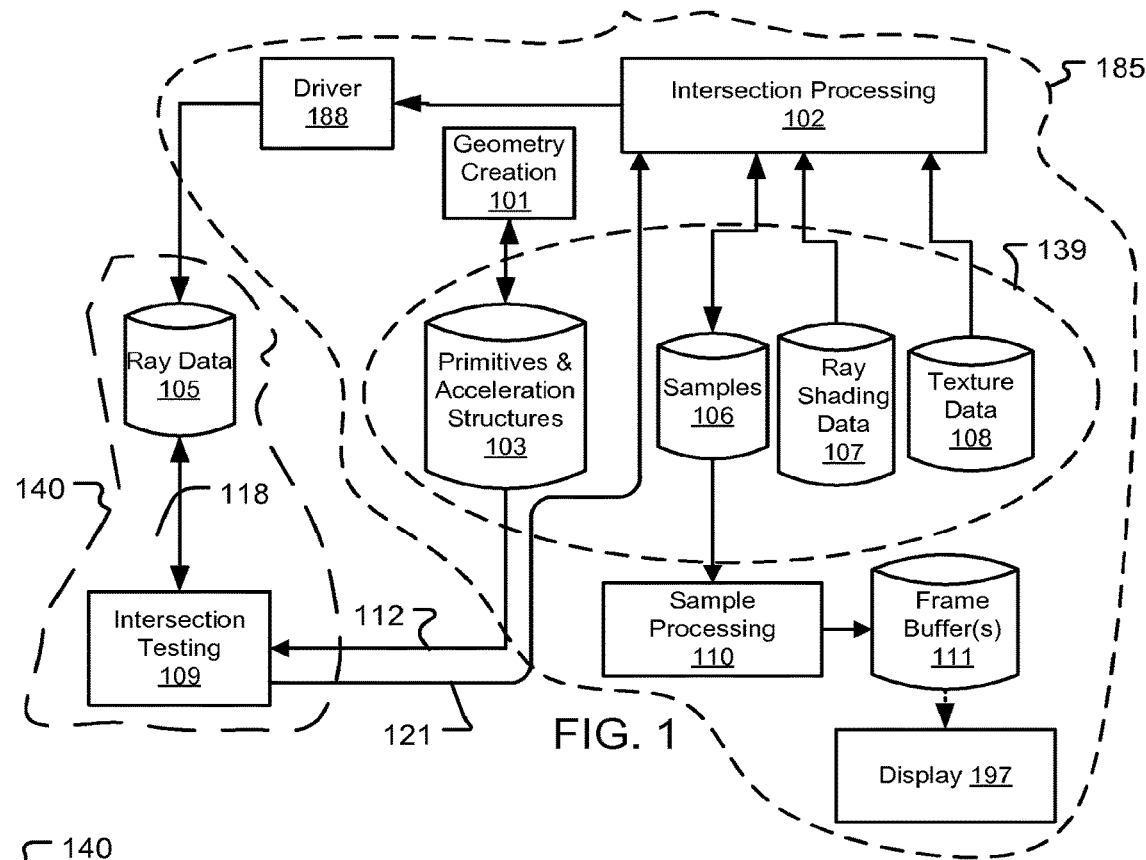
FIG. 1 illustrates a first example of a system for rendering scenes with ray tracing.

The following description is presented to enable a person of ordinary skill in the art to make and use various aspects of the inventions. Descriptions of specific techniques, implementations and applications are provided only as examples. Various modifications to the examples described herein may be apparent to those skilled in the art, and the general principles defined herein may be applied to other examples and applications without departing from the scope of the invention. This description first proceeds by introducing aspects relating to an example of a three-dimensional (3-D) scene (FIG. 1), that can be abstracted with geometry acceleration data, as in the example of FIG. 2. Such a 3-D scene can be rendered as a two-dimensional representation with systems and methods according to the examples illustrated and described.

As introduced in the background, a 3-D scene needs to be converted into a 2-D representation for display. Such conversion requires selecting a camera position, from which the scene is viewed. The camera position frequently represents a location of a viewer of the scene (e.g., a gamer, a person watching an animated film, etc.) The 2-D representation is usually at a plane location between the camera and the scene, such that the 2-D representation comprises an array of pixels at a desired resolution. A color vector for each pixel is determined through rendering. During ray tracing, rays can be initially cast from the camera position to intersect the plane of the 2-D representation at a desired point, and then continue into the 3-D scene. A location at which a ray intersects the 2-D representation is retained in a data structure associated with that ray.

A camera position is not necessarily a single point defined in space, and instead a camera position can be diffuse, such that rays can be cast from a number of points considered within the camera position. Each ray intersects the 2-D representation within a pixel, which can also be called a sample. In some implementations, a more precise location of where a ray intersected a pixel can be recorded, which may allow more precise interpolation and blending of colors.

For clarity in description, data for a certain type of object, e.g., a primitive (e.g., coordinates for three vertices of a triangle) often is described simply as the object itself, rather than referring to the data for the object. For example, when referring to "fetching a primitive", it is to be understood that data representative of that primitive is being fetched, rather than a physical realization of that primitive. However, in particular regard to rays, this disclosure distinguishes between an identifier for a ray, and data defining the ray itself, and where the term "ray" is used, it is considered generic to both a ray ID and data defining the ray, unless the context shows otherwise.

Representing realistic and finely detailed objects in the 3-D scene is usually done by providing a large number of small geometric primitives that approximate a surface of the object (i.e., a wire frame model). As such, a more intricate object may need to be represented with more primitives and smaller primitives than a simpler object. Although providing a benefit of higher resolution, performing intersection tests between rays and larger numbers of primitives (as described above, and as will be described further below) is computationally intensive, especially since a complex scene may have many objects. Without some external organization imposed on the scene for intersection testing, each ray would have to be tested for intersection with each primitive, which would result in extremely slow intersection testing. Therefore, a way reduce a number of ray/primitive intersection tests required per ray is helpful to accelerate ray intersection testing in the scene. One way to reduce the number of such intersection tests is to provide extra bounding surfaces that abstract the surfaces of a number of primitives. Rays can be first intersection tested against the bounding surfaces to identify a smaller subset of primitives to intersection test with each ray. Such bounding surface shapes can be provided in a variety of shapes. In this disclosure, a collection of such bounding surface elements is called Geometry Acceleration Data (hereinafter referred to as GAD).

A more extensive treatment of GAD organization, elements, and usages can be found in U.S. patent application Ser. No. 11/856,612, filed on Sep. 17, 2007, which is incorporated by reference herein. Thus, a briefer treatment of GAD is provided here for context, and further detail concerning these matters can be obtained from the above-referenced application.

As introduced, GAD elements generally include a geometric shape that encloses, in 3-D space, a respective collection of primitives, such that failure to intersect a surface of the geometric shape with a ray indicates that the ray also does not intersect any primitive bounded by the shape. GAD elements can comprise spheres, axis-aligned bounding boxes, kd-trees, octrees, and other sorts of bounding volume hierarchies, and as such, an implementation according to this disclosure can use a bounding scheme, such as the cutting planes of a kd-tree, or another way to locate and specify extents of bounding surfaces that bound one or more scene primitives. In sum, since GAD elements primarily are useful in abstracting primitives for more quickly identifying intersections between rays and primitives, GAD elements preferably are shapes that can be easily tested for intersection with a ray.

GAD elements can be interrelated to each other. An interrelation of GAD elements herein can be a graph comprising nodes and edges, where the nodes represent GAD elements and the edges represent an interrelation between two of the GAD elements. Where a pair of elements is connected by an edge, the edge may indicate that one of the nodes has a different relative granularity than the other node, which can mean that one of the nodes connected by that edge bounds more or fewer primitives than the other node. In some cases, the graph can be hierarchical, such that there is a direction to the graph, and the graph can be traversed in order from parent nodes to child nodes, narrowing remaining bounded primitives along the way. In some cases, the graph can have homogeneous GAD elements, such that if a given GAD element bounds other GAD elements, that given GAD element also does not directly bound primitives (i.e., in a homogenous GAD structure, primitives are bounded directly by leaf node GAD elements, and non-leaf nodes directly bound other GAD elements and not primitives.)

A graph of GAD elements can be constructed with a goal of maintaining some uniformity in a number of elements and/or primitives bounded by each GAD element. A given scene can be subdivided until such a goal can be achieved.

In the following description, it is provided that there is a mechanism to determine, based on a ray having been determined to intersection a given GAD element, what other GAD elements should be tested next in response. In an example of a hierarchical graph, then the elements tested next generally would be child nodes of a tested node.

One usage of GAD implemented in a number of the examples herein includes that when a ray is found to intersect a given GAD element, it is collected with other rays that also have been determined to intersect that element. When a number of rays have been collected, a stream of GAD elements connected to that element are fetched from main memory and streamed through testers that each have a different collected ray. Thus, each tester maintains its ray stationary in a local fast memory while geometry is fetched from slow memory when needed and allowed to be overwritten. More generally, this description provides a series of examples of how computing resources can be organized to process rays for detecting intersections of such rays with geometric shapes (GAD elements and primitives), ultimately to identify what rays hit what primitives.

Other aspects that these examples can implement include any of (1) queues are provided for outputs from intersection testing to shading, (2) that ray data is localized to some degree to compute resources, while geometric shapes are fetched from slower memory when there is a determination to test certain rays against those shapes, and (3) that intersection testing is driven by identifying rays (using ray identifiers) to compute resources performing intersection testing, causing each compute resource to fetch data corresponding to the identified ray(s) from its localized memory(ies).

The following description present examples of systems and portions thereof for rendering 2-D representations of 3-D scenes using ray tracing. Two principal functional components of such systems are (1) tracing rays to identify intersections and (2) shading identified intersections.

FIG. 1 illustrates aspects of a system for use in ray tracing a scene composed of primitives. Generally, any of the functions or duties of any of the functional units in FIG. 1 and other figures may be implemented in multiple hardware units, or pieces of software, software subroutines, and may even be run on different computers. In some cases, such implementation is described more particularly, as it can bear on system function and performance.

FIG. 1 illustrates a geometry unit 101, an intersection processing unit 102, a sample processing resource 110, a frame buffer 111, and a memory resource 139 operable or otherwise configured to store or storing geometry shapes comprising GAD elements and primitives (primitive and GAD storage 103), samples 106, ray shading data 107, and texture data 108. Geometry unit 101 inputs a description of a scene to be rendered, and outputs primitives and an acceleration structure comprising GAD elements bounding the primitives. Intersection processing 102 shades identified intersections between rays and primitives, and uses inputs, such as textures, shading code, and other sample information obtained from the data sources illustrated. Outputs of intersection processing 102 comprise new rays (discussed below) and color information that will be used in producing the 2-D representation of the scene being rendered. All of these functional components can be implemented on one or more host processing resources, generally indicated by dashed line 185.

As described above, during shading of identified ray/primitive intersections, intersection processing 102 can generate new rays to be intersection tested. A driver 188 may interface with intersection processing 102 to receive these new rays, and manage communication between intersection processing resource 102 and a localized intersection testing region 140 that comprises a ray data storage 105 and a intersection testing unit 109. Intersection testing region 140 tests rays for intersection, and has read access via interface 112 to primitive and GAD storage 103, and outputs indications of identified intersections via results interface 121 to intersection processing 102. It is preferred that local ray data storage 105 be implemented in relatively fast memory that can be relatively smaller in size, while primitive and acceleration structure storage is implemented in relatively large and slow main memory 139 that can potentially be a main dynamic memory of host 185.

One aspect of ray tracing high resolution scenes is the sheer volume of ray data and shape data involved. For example, rendering a full HD resolution film at 30 frames per second requires determining a color for over 60 million pixels a second (1920×1080>2M, 30 times per second). And, to determine each pixel color, many rays may be required. Thus, many hundreds of millions of rays may need to be processed every second, and if every ray requires several bytes of storage, then ray tracing full HD scenes can many gigabytes of ray data per second, or more. Also, at any given time, a large amount of ray data must be stored in memories. There almost always is a tradeoff between access speed and memory size, such that cost-effective large memories are comparatively slow. Also, large memories are constructed such that the memories are not effectively used unless a large-enough block of data can be accessed and used. Thus, one challenge is to be able to consistently identify large enough groups of ray to efficiently access them from memory. However, there can be processing overhead, sometimes high overhead, in identifying such rays, as shown by approaches such as finding and group testing of rays with similar origins and directions. In one aspect, the following example architectures disclose how to organize and use a plurality of computing resources, faster more expensive memories, slower larger memories to increase throughput of ray intersection testing and shading for scene rendering.

FIG. 1 thus illustrates a decoupling of intersection testing from shading of identified intersections by a flow of data comprising ray definition data being stored in a fast memory localized to a compute resource 109 that tests rays for intersection with GAD elements and primitives. An output of the intersection testing 109 comprises indications of identified rays intersecting with identified primitives. Intersection processing 102 receives these indications, performs shading according for those intersections, and can instantiate new rays for testing, which ultimately are stored in fast ray data memory 105. Such decoupling can be provided in a variety of implementations that use one or more of fixed function hardware and general purpose computers programmed with software according to this description, with communication means selected according to the processing resources used. One recurrent aspect in these implementations however, is that shape data tested for intersection with rays is transient in intersection testing region 140 compared with ray definition data. In other words, where applicable, faster memory is allocated primarily to ray data while shapes are streamed through testers but little computational resources are used to optimize caching of such shape data. Various of the following figures illustrate more particular examples of such decoupling, data flow, ray data storage and collocation with intersection testing resources.

FIG. 1 also illustrates that ultimately frame buffer 111 outputs can be used to drive a display 197. However, this is only an example of an output that can result from intersection testing and shading operations, which can for convenience be called rendering. For example, outputs also can be written to computer readable media that include rendering products such as sequences of rendered images for later display or for distribution on tangible computer readable media or transmitted over networks comprising computing resources interconnected by communication links. In some cases, the 3-D scene being rendered can be representative of a real-world 3-D scene, such as may be the case for immersive virtual reality conferencing or for rendering images comprising perspectives of 3-D CAD models. In such cases, the rendering methods operate on or otherwise transform data representative of physical objects. In other cases, the 3-D scene may have some objects representative of physical objects and other objects that are not. In still further 3-D scenes, the entirety of the scene may be fictional, such as in a video game, and so on. Ultimately, however, it is generally the case that the methods are transformative of articles of memory, displays, and/or computer readable media.

It also is the case that rendering with ray tracing has been implemented since 1979, and a variety of techniques have been developed for intersection testing and other functions required to implement rendering with ray tracing. Therefore, the particular architectures and methods described herein do not preempt the fundamental principle of ray tracing for use in rendering 3-D scenes into 2-D representations.

Figure 2:
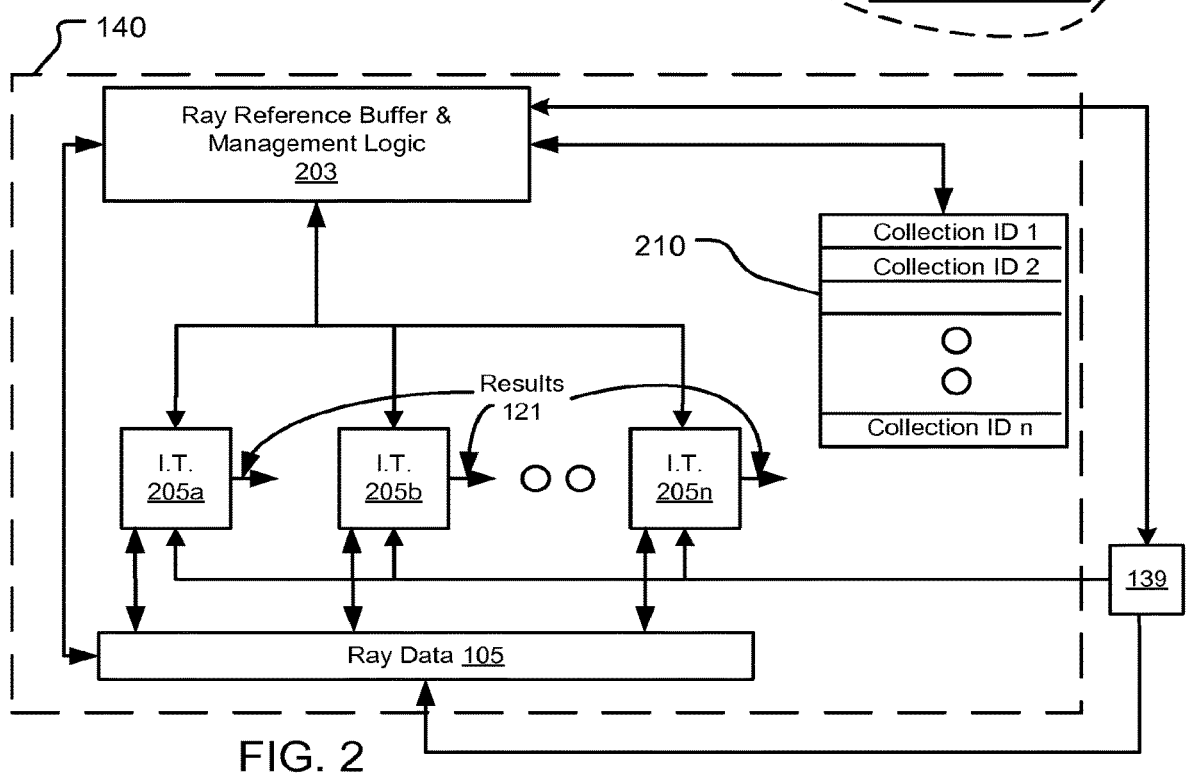
FIG. 2 illustrates additional aspects of a portion of FIG. 1.

FIG. 2 illustrates that intersection testing unit 109 of intersection testing region 140 includes one or more individual test resources (a.k.a. test cells), which can test a geometric shape against a ray. The region 140 includes test cells 205*a* through 205*n* that each receive ray data from ray data storage 105 and geometric shape data from memory 139. Each test cell 205*a*-205*n* produces results for communication through results interface 121 to intersection processing 102, and which can include indications whether a given ray has intersected a given primitive. By contrast, results of intersection testing GAD elements with rays are provided to logic 203. Logic 203 maintains collections 210 of references to rays that relate those rays to GAD elements that those rays have been determined to intersect.

Generally, system components are designed to support unknown time-to-completion of a given, specific, ray test. Intersection test unit 109 has read access to the geometry memory, and has a queue of references to rays as inputs. As an output of intersection testing, each ray is associated with the piece of geometry (called a primitive in this disclosure for convenience) that it intersected with first. Other pieces of geometry (i.e., primitives) can be viewed as irrelevant.

As introduced above, region 140 includes ray reference buffer and associated management logic 203, which maintains list 210 of ray collections to be tested in test cells 205*a*-205*n*. Buffer management logic 203 can be implemented in a fixed function processing resource or in hardware configured with instructions obtained from computer readable media. Such instructions can be organized in modules according to the functions and tasks attributed to logic 203 herein. A person of ordinary skill also would be able to provide further implementations of logic 203 based on these disclosures.

Logic 203 can assign rays and geometry to test cells, and can handle communication with the other units in the design. In one aspect, each ray collection in list 210 comprises a plurality of ray identifiers that are all to be tested for intersection with one or more geometric shapes, and logic 203 maintains such ray collections. In a more particular example, the plurality of ray identifiers has been determined to intersect a GAD element identified in the collection, and the next GAD elements to be tested for intersection with that plurality of rays are related to that intersected GAD element in a graph of GAD elements. The related elements for a given collection are fetched from memory 139 when intersection testing with those elements is to commence.

Stated alternately, logic 203 can retain references indicative of rays intersecting sub-portions of geometry data corresponding to respective child nodes in a temporary ray reference buffer, allowing the deferral of further processing of such rays. In examples of hierarchically arranged GAD, such deferral can defer processing against sub-portions of geometry acceleration data below the child node until a subsequent time when the accumulated number of rays intersecting the subportion of geometry of the child node is found to be suitable for further processing.

Logic 203 also can communicate with memory 139 for setting up memory transactions providing geometric shapes for testing to test cells 205*a*-205*n*. Logic 203 also communicates with ray data storage 105 and determines what rays have data stored there. In some implementations, logic 203 can obtain or receive rays from memory 139 or from shading processes executing in intersection processing unit 102 and provide those rays, when space is available, to memory 105 for storage and use during intersection testing.

Thus, logic 203 can maintain a temporary ray reference buffer which includes an association of ray identifiers to identifiers of GAD shapes. In an implementation, an identifier for a GAD element can be hashed to identify a location in the buffer for storing a given collection associated with that GAD element. The associations are generally referred to as collections herein when describing storing or collecting such data in memory, and in some places in the present application, the term "packet" is used, generally to connote movement of collection data during testing, and returning of results from intersection testing. Such returned results can be coalesced into stored collections in memory that are associated with GAD shapes, as described below.

In sum, FIG. 2 continues to illustrate that ray definition data is stored in fast memory 105, while shape data to be tested for intersection with such rays comes from memory 139. The above disclosure also shows that it is preferred to have a plurality of next-to-be-tested shapes fetched from memory 139 at once and sequentially tested for intersection with a group of rays known to have intersected a "parent" GAD element.

Figures 3, 4:
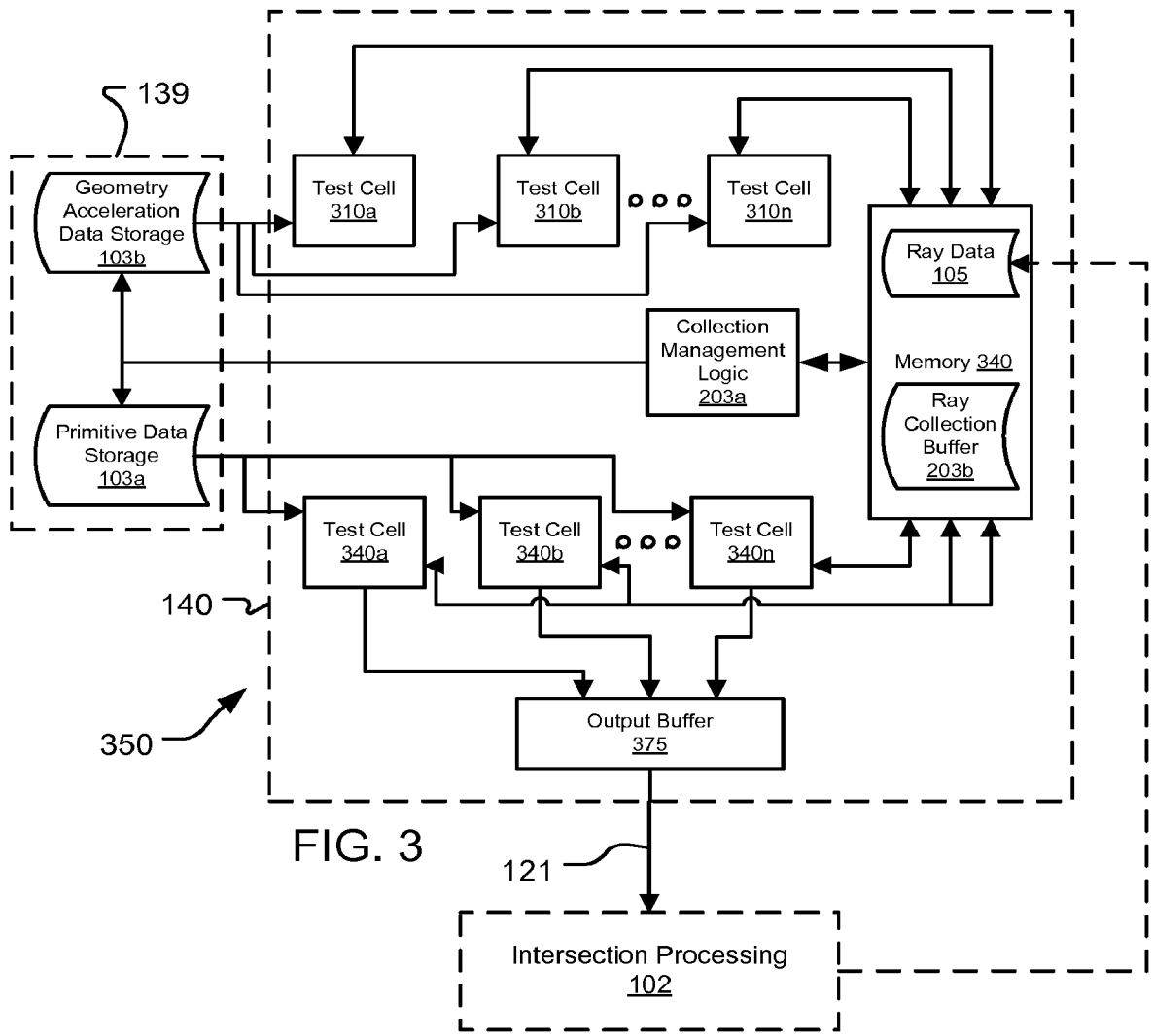
FIG. 3 illustrates another implementation of an intersection testing portion of a ray tracing rendering system.
FIG. 4 illustrates an example of a computing resource for intersection testing useful in the systems of FIGS. 1-3.

Now, FIG. 3 includes a block diagram of an example of an Intersection Testing Unit (ITU) 350 implementation of region 140 (FIG. 1) that can be used in a rendering system for ray tracing two dimensional representations of a three dimensional scene. ITU 350 includes a plurality of test cells 310*a*-310*n* and 340*a*-340*n*. GAD elements are illustrated as being sourced from GAD data storage 103*b* and primitive data is sourced from primitive data storage 103*a*.

Test cells 310*a*-310*n* receive GAD elements and ray data to test against those elements (i.e., these test cells test GAD elements). Test cells 340*a*-340*n* receive primitives and ray data to test against those primitives (i.e., these test cells test primitives). Thus, ITU 350 can test a collection of rays for intersection with primitives and a separate collection of rays for intersection with GAD elements.

ITU 350 also comprises collection management logic 203*a* and collection buffer 203*b*. Collection buffer 203*b* and ray data 105 can be stored in a memory 340 that can receive ray data from memory 139 (for example). Collection buffer 203*b* maintains ray references associated with GAD elements. Collection management 203*a* maintains those collections based on intersection information from test cells. Collection management 203*a* also can initiate the fetching of primitives and GAD elements from memory 139 for testing ray collections.

ITU 350 returns indications of identified intersections, which can be buffered in output buffer 375 for ultimate provision via results interface 121 to intersection processing 102. Indications information sufficient to identify a ray and a primitive which the ray was determined, within a given degree of precision, to intersect.

ITU 350 can be viewed as a function or a utility that can be called through a control process or driver (e.g., driver 188) that provides ITU 350 with rays and geometric shapes against which the rays would be tested for intersection. For example, ITU 350 can be fed information through driver 188, i.e., a process that interfaces ITU 350 with other rendering processes, such as shading, and initial ray generation functions. From the perspective of ITU 350, ITU 350 need not be aware of the origin of the information provided to it, as region 140 can perform intersection testing using the rays, GAD, and primitives (or more generally, scene geometry) provided to it, or obtained by it based on other information provided to it.

As described above, ITU 350 may control how, when, and what data is provided to it, such that ITU 350 is not passive, and may for example, fetch ray or geometry data, or acceleration data as required for intersection testing. For example, ITU 350 may be provided with a large number of rays for intersection testing, along with information sufficient to identify a scene in which the rays are to be tested. For example, ITU 350 may be provided more than ten thousand rays (10,000) rays for intersection testing at given time and as testing for those rays complete, new rays (generated by intersection processing 102) may be provided to keep the number of rays being processed in the ITU 350 at about the initial number, as described below. ITU 350 may thereafter control (in logic 203*a* (see FIG. 3)) temporary storage of the rays during processing (in ray collection buffer 203*b* (see FIG. 3)) and may also initiate fetching of primitives and elements of GAD as needed during the processing.

As described above, GAD elements and primitives are transient in ITU 350 compared to rays, as ray identifiers are maintained in buffer 203*b* and organized with respect to GAD elements, while data defining rays is maintained ray data 105. Each of buffer 203*b* and ray data 105 can be maintained in memory 340, which may be physically implemented in a variety of ways, such as one or more banks of SRAM caches.

As introduced above, logic 203*a* tracks status for ray collections stored in memory 340, and determines which collections are ready for processing. As shown in FIG. 3, logic 203*a* is communicatively coupled to memory 340, and can initiate delivery of rays for testing to each of the connected test cells. In situations where GAD elements bound either only GAD elements or only primitives, rather than some combination thereof, logic 203*a*, depending on whether a particular collection is associated with a GAD element that bounds primitives or other GAD elements, can assigns rays either to test cells 340*a*-340*n* or test cells 310*a*-310*n*.

In examples where a particular GAD element may bound both other GAD elements and primitives, ITU 350 can have datapath for providing both GAD elements and primitives to each test cell, as well as rays, so that logic 203*a* can arrange for testing rays of collections among the testing resources. In such examples, because of the typical difference in shape between GAD elements and primitives (spheres versus triangles, for example), an indication to switch test logic or load an intersection test algorithm optimized for the shape being tested may be provided from logic 203*a*.

Logic 203*a* may directly or indirectly cause provision of information to test cells 310*a*-310*n* and test cells 340*a*-340*n*. In indirect situations, logic 203*a* can provide information to each test cell so that each test cell may initiate fetching of ray data for test from memory 340. Although logic 203*a* is illustrated separately from memory 340, for simplicity of description, logic 203*a* may be implemented within circuitry of memory 340, as management functionality performed by logic 203*a* largely relates to data stored in memory 340.

An ability to increase parallelization of access to memory 340 by intersection test resources is an advantage of some aspects described herein. As such, increasing a number of access ports to memory 340, preferably up to at least one per test cell is advantageous. Example organizations related to such parallelization are further described below.

Also, ITU 350 can operate asynchronously with respect to units that provide input data to it, or receive outputs from it. Here, "asynchronous" can include that the ITU may receive and begin intersection testing of additional rays while intersection testing continues for previously received rays. Also, "asynchronous" may include that rays do not need to complete intersection testing in an order that ITU 350 received them. Asynchronous also includes that intersection testing resources in ITU 350 are available for assignment or scheduling of intersection testing without regard to position of a ray within a 3-D scene, or a scheduling grid superimposed on the scene, or to test only rays having an intergenerational relationship, such as parent rays and children rays spawned from a small number of parent rays, or only rays of a specific generation—e.g., camera rays or secondary rays.

ITU 350 also includes an output buffer 375 which receives indications of identified intersections of primitives and rays which intersected the primitive. In an example, the indications include an identification for a primitive paired with an information sufficient to identify a ray that intersected the primitive. Identification information for a ray may include a reference, such as an index, which identifies a particular ray in a list of rays. For example, the list may be maintained by driver 188 running on a host 185, and the list may be maintained in memory 139. Preferably, memory 139 also includes ray definition data for all the rays in memory 340. However, the ray identification information may also include information, such as the ray's origin and direction, sufficient to reconstruct the ray, if memory 139 does not contain such information. It is usually the case that fewer bits would be required to pass references, which can be an advantage.

FIG. 4 illustrates an example of a test cell 310*a*, which may contain a working memory 410 and test logic 420. Working memory 410 may be several registers, which contain information sufficient to test a line segment for intersection with a surface, or may be more complicated in other implementations. For example, working memory 410 may store instructions for configuring test logic 420 to test a particular shape received for intersection and may detect what shape was received based on the data received. Working memory 410 also may cache detected hits, where each test cell is configured for testing a series of rays against geometric shapes, or vice versa; then, the cached hits may be output as a group. Working memory may also receive incoming shape data from storage 103b Test logic 420 performs the intersection test at an available or selectable resolution, and can return a binary value indicating whether or not there was an intersection detected. The binary value can be stored in the working memory for reading out, caching, or outputting for latching during a read cycle, such as a read cycle in memory 340 for a GAD element test.

Figure 5:
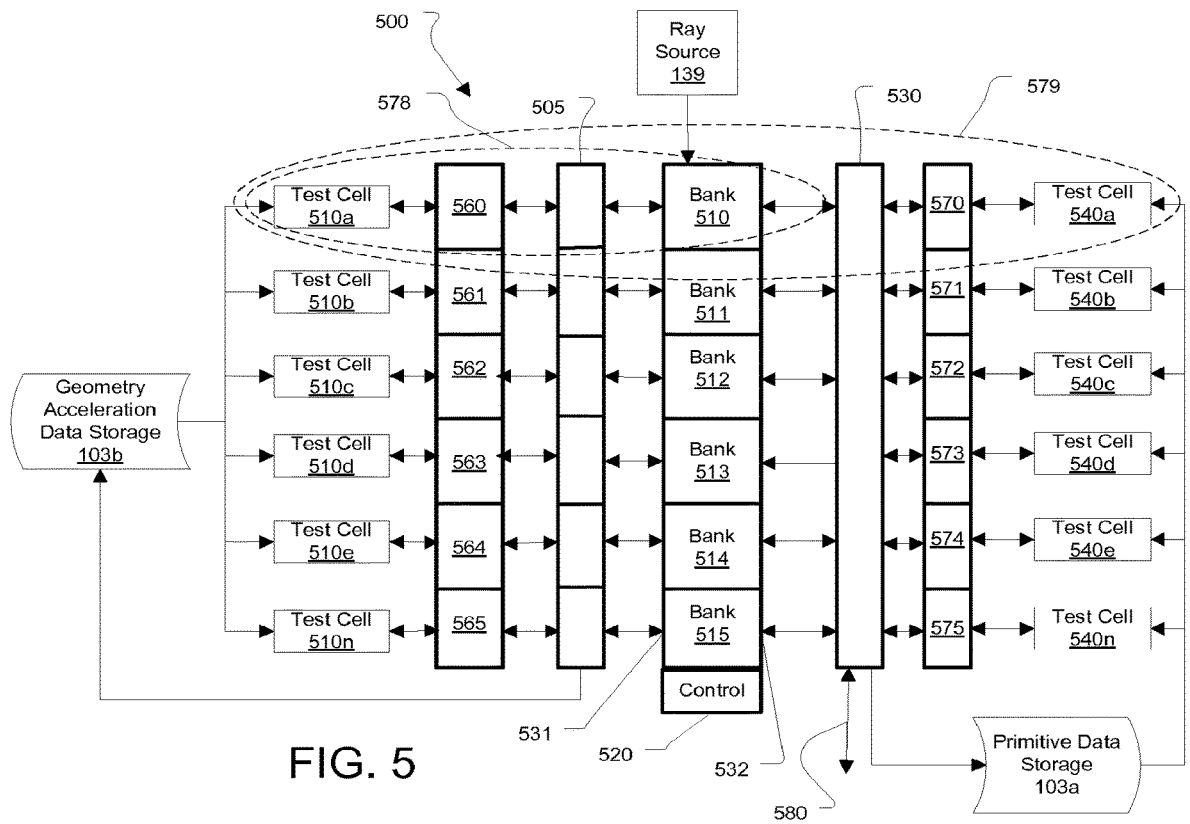
FIG. 5 illustrates a further example of an intersection testing system architecture for use in ray tracing.

FIG. 5 illustrates aspects of an implementation of an intersection testing unit 500, focusing in more detail on an example memory organization. In ITU 500, test cells 510a-510n and 540a-540n appear and correspond with 310a-310n and 540a-540n in this example. This does not imply any requirement as to number of test cells. Thus, in ITU 500, both primitives and GAD elements may be tested in parallel. If it were determined, however, that more test cells of one variety or another would be required, then any test cell could be reconfigured (reallocated if hardware or reprogrammed if software) as appropriate. As transistor density continues to increase, more such test cells can be accommodated in hardware implementations (or as resources available for executing software). As will be described, portions of the test cells can be treated as a operational group, in that they will test rays against a common shape (i.e., a primitive or GAD element). Test cells 540a-540n can return binary values indicating an intersection with a primitive at a specified precision level (e.g., 16 bits), and can also return a more precise indication of where on the primitive the ray intersected, which can be useful for larger primitives.

In ITU 500, memory 540 comprises a plurality of independently operation banks 510-515, each of which has two ports (ports 531 and 532 of bank 515 identified). One port is accessed through GAD test logic 505, while the other is accessed through primitive test logic 530. Each of GAD and primitive test logic 505 and 530 operate to manage a flow of data between respective working buffers 560-565 and 570-575, and respectively to obtain GAD elements for test from GAD storage 103a and from primitive storage 103b.

The banks 510-515 are intended to operate, for the most part, to provide non-conflicting access to ray data by GAD and primitive test logic 505 and 530, such that each test cell 510a-510n and test cell 540a-540n can be provided a ray from separate banks of 510-515. Such non-conflicting access, it would be understood from these disclosures, to be implementable for example by separate cache banks, as well as a cross-bar architecture allowing access by a port to different physical portions of memory. If testing of rays stored in a bank by more than one test cell were permitted, then conflicts could arise where two rays to be tested reside in the same bank, and in such cases, the accesses can be handled sequentially by the test logics 505 and 530. In some cases, working buffers 560-565 and 570-575 can be loaded for a next processing cycle while other processing is completed. The ITU 500 also can be organized into regions. For example, region 578 comprises a test region for GAD elements, as it comprises GAD tester 510a and memory bank 510, while region 579 comprises a test region for both GAD elements and primitives, as it comprises testers 510a and 540a (one for each of GAD and primitives) and access to memory bank 510 storing ray data to be used in tests involving those the test cells of region 578 and 579.

By testing rays in consistent arrangements, tracking of which ray is assigned to which test cell can be reduced. For example, each collection can have 32 rays, and there may be 32 of test cells 310a-310n (510a-510n). For example, by consistently providing the $4^{th}$ ray in a collection to test cell 310d, test cell 310d need not maintain information about what ray was provided to it, but need only return an indication of intersection. As will be shown, other implementations for maintaining consistency can be provided, including passing a packet of ray identifiers among test cells, and allowing test cells to write intersection results to the packet.

Storage for ray collections may be implemented as an n-way interleaved cache for ray collections, such that any given ray collection may be stored in one of n portions of ray collection buffer 203b or 520. Ray collection buffer 203b or 520 may then maintain a list of the ray collections stored in each of the n portions of the buffer. An implementation of ray collection buffer 203b or 520 may include using an identifying characteristic of an element of GAD associated with a ray collection, for example, an identifier string unique among the elements of GAD used in rendering the scene can be used. The alphanumeric character string may be a number, or a hash, or the like. For example, a hash can reference one of the n portions of ray collection buffer 203b and 520.

In other implementations, elements of GAD may be predestined for storage in a given portion of ray collection buffer 203b and 520 by, for example, mapping segments of the alphanumeric strings in use to portion(s) of such buffer. Primitive/ray intersection output 580 represents an output for identifying potential primitive/ray intersections, output 580 can be serial or parallel. For example, where 32 primitive test cells 540a-540n exist, output 580 can include 32 bits indicating presence or absence of an intersection for each ray against the primitive just tested. Of course outputs could come directly from the test cells in other implementations, such as for example, in packet implementations. Outputs can be serial and can be serially stored by test cells in the packet.

Ray data is received in memory 340 (520) from ray sources, such as shaders. Collection management logic (e.g., 203a of FIGS. 2 & 3) operates to initially assign rays to collections, where each collection is associated with an element of GAD. For example, an element of GAD may be a root node of the graph, and all rays received are initially assigned to one or more collections associated with the root node. Reception of rays may also be in groups sized to be a full collection, e.g., from an input queue, and each such collection can be treated like a collection identified in ray collection buffer 203b, for example.

Focusing on processing of one collection, with the understanding that a number of collections may be tested in parallel, retrieval of rays of the collection associated with the test node from memory 340 is initiated by collection management logic 203a, by for example, providing addresses of such rays (ray identifiers), which are stored as data in the collection, for allowing retrieval of such rays from memory 340, or by example of FIG. 5, from banks 510-515, which provide the ray data on plural output ports for reception by test cells (e.g., test cells 560-565).

With regard to testing GAD elements bounded by the node selected for test (i.e., the GAD element associated with the selected node bounds other GAD elements), distribution of ray data for rays of the collection being tested is finished, and fetching of bounded GAD elements also is performed (not necessary to have such fetching sequential to ray distribution). For such fetching, logic 203a can input addressing information to GAD storage 103b (or by whatever memory management means is provided), which outputs the addressed GAD element(s) to test cells 310a-310n. Where multiple GAD elements are bounded, as is usually the case, the elements can be arranged to be streamed serially to test cells, such as with a serializing buffer, so as to allow for block reads of multiple GAD elements.

In the test cells (e.g., 310a-310n), rays of the collection can be tested for intersection with the serially provided GAD elements (e.g., a different ray in each test cell). Where a ray is determined to intersect, it is determined whether a collection for the intersected GAD element exists, if so, then the ray is added to that collection, room permitting, and if not then the collection is created, and the ray is added. Where an existing collection has no room, then a new collection can be created.

In some implementations, a 1:1 correspondence of a maximum number of rays in a collection to number of test cells 310a-310n is provided such that all the rays of a collection can be tested in parallel against a given GAD element, which can include an architecture where the throughput generally is around what can be obtained with 1:1 correspondence of rays to test cells, but which can provide for a sequential passing of a packet (e.g., information indicative of a collection, as described above) among different test cells, such that different test cells can be testing rays from different packets, even though overall the rays of a given collection can be viewed as being tested in parallel.

Thereafter, rays are tested for intersection with the primitive provided to the test cells (i.e., each test cell has a different ray and tests that ray with a common primitive, in this example.) After testing, each test cell indicates detected intersections.

Each ray of the collection is tested in its test cell for intersection with the GAD element provided to the test cells (e.g., in the multiple bank example of FIG. 5 (regions 578 and 579 illustrated), rays can be considered localized to a GAD element test region and/or a primitive test region, for example, such that a bank serves one or more testers of each kind with ray data).

Because the output from testing rays for intersection with GAD elements differs from testing the same rays for primitive intersection (i.e., intersection with a GAD element results in collection into a collection for that GAD element, while intersection with a primitive results in determination of a closest intersection with that primitive, and output of such intersection), conflicts to write back collection data or output intersections should not normally occur, even where a particular ray happens to be in two collections being tested in parallel. If further parallelism were to be implemented, for example, by testing multiple collections of rays for primitive intersection in multiple instantiations of test cells 340a-340n, then features can also be implemented to enforce orderly completion of such testing, such as storage of multiple intersections, or lock bits, and the like. And in the case of the example of FIG. 5, where data for a given ray can be provided from only one bank to one tester type (i.e., a given ray is located in one memory bank), then multiple GAD testers, for example, would not be testing the same ray at the same time, thereby avoiding the issue of write back conflicts.

In sum, a method can include receiving rays, assigning them to collections, selecting for test ready collections, where readiness can be algorithmically determined, assigning rays of the selected collections to appropriate test cells and streaming appropriate geometry for intersection test through the test cells. Outputs depend on whether the geometry are scene primitives or GAD elements. For rays tested against GAD elements, the GAD elements are identified based on graph connection with the node associated with the collection being tested, and rays are added to collections associated with the GAD elements being tested. The collections are reviewed for readiness and selected for test when ready. For ray intersections with primitives, a closest intersection is tracked with the ray. Because rays are tested when associated with ready collections, it is implicit that intersection testing for a particular ray is deferred until a collection with which it is associated is determined ready for testing. Rays can be collected coincidentally into multiple collections, which allows such rays to be tested against disparate portions of scene geometry (i.e., they need not be tested in order of traversal).

As previously addressed, the ITU stores in a memory, information representative of rays previously received from the ray input. The ITU, for these rays, maintains an association of each ray with one or more ray collections of a plurality of collections. The ITU also maintains indications of collection fullness for the plurality of collections stored in the memory. These indications may be respective flags indicating full collections or may be numbers representing a number of rays associated with a given collection. Further details, and other examples of implementations, and variations related to implementing testing algorithms are provided in the related applications referenced above, showing that the information presented literally here is not an exclusive treatment thereof.

As is apparent from the disclosures to this point, rays are loaded from (or accessed in) a memory based on information provided in a collection of rays. Therefore, such loading may include determining respective memory locations where data representative of each ray is stored. Such data may be comprised in that ray collection, e.g., a ray collection may include a list of memory locations or other references to storage, at which ray data for the rays in that collection are stored. For example, a ray collection may comprise references to locations in a memory, e.g., memory 340, or a bank of a memory (e.g., bank 510), or some other implementation; these references may be absolute, offset from a base, or another suitable way to reference such data. These aspects were described from the perspective that separate ray data and ray collection data were maintained. However, in some implementations, that separation need not be so explicit or apparent, in that ray collection data and ray data can be maintained as a content associative database for example, where associations between collections and rays, and between collections and elements of GAD are maintained and used to identify rays associated with collections for test, and also elements of GAD associated with the collections.

Also, apparent is that ray data would be "stationary" in test cells as either primitives or GAD elements are cycled through the test cells. Other implementations are possible, as described in related applications, but a principal focus of these disclosures is providing for rays to be localized or otherwise stationary with test cells, while geometry is fetched and tested.

Figure 6:
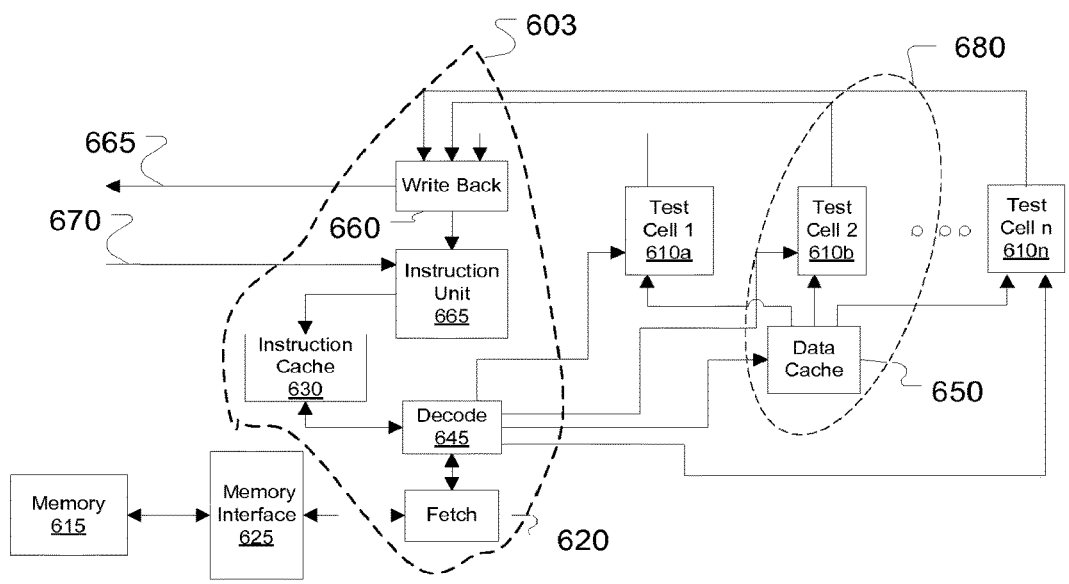
FIG. 6 illustrates aspects of another example of an architecture for intersection testing.

Aspects of such an implementation are presented with respect to FIG. 6. In particular, another implementation of intersection testing logic can comprise a processor 605 comprising test control logic 603 (akin to test logic 203 of FIG. 2) which includes a fetch unit 620 for coupling to a memory interface 625, an instruction cache 630, an instruction decoder 645, and a data cache 650. Data cache 650 feeds test cells 610a-610n. Instruction decoder 645 also provides input to test cells 610a-610n. An instruction generator 665 provides instruction input to instruction decode 645. Test cells output indications of detected intersections to write back unit 660, which in turn can store data in data cache 650. Output from write back unit 660 is also used as input to instruction generator 665 when generating instructions. It is contemplated that instructions used in such a processor 605 may be of a single instruction, multiple data variety, where the instructions processed in the test cells are intersection tests between defined surfaces (e.g., primitives and GAD elements) and rays.

In an example, the "instruction" may include data defining a geometric shape, such as a primitive or an element of GAD, and the multiple data elements may include separate references for rays for testing against the geometric shape provided as the "instruction." As such, the combination the geometric shape and the multiple ray references can be considered a discrete packet of information deliverable to multiple of the illustrated test cells. In some cases, the packet delivery can proceed sequentially, such that multiple packets are "in flight" among the plurality of test cells.

Such test cells can exist in the context of a full-featured processor with a large instruction set, and each such packet may thus include other information sufficient to distinguish the purpose of the packet. For example, there may be a number of bits included to differentiate a packet formulated for intersection testing from packets existing for other purposes, for which different operations will be performed. Also, a variety of intersection test instructions may be provided, including for different primitive shapes and different GAD element shapes, or even for different testing algorithms, as appropriate.

In a typical example, each intersection test packet initially can contain a reference to a geometry element, or data for the geometry element, either being an element of GAD or a reference to a primitive, and references to a number of rays to test for intersection with the geometry element (i.e., the "packet" described above).

Decoder 645 can interprets the instruction to determine the reference to the geometry element, and initiates a fetch of the element through fetch 620 (control for a memory interface, such as memory interface 625). In some implementations, decoder 645 can lookahead a number of instructions to initiate fetching of geometry elements needed in the future. The geometry element can be provided by fetch 620 to decoder 645, where decoder 645 provides the geometry element to test cells 610a-610n.

Decoder 645 also provides the ray references from the instruction as functional addresses to data cache 650, which provides respective data sufficient for intersection testing of each ray to each of test cell 610a-610n. Data associated with the ray, which is not needed for intersection testing need not be provided. Thus, data cache 650 can serve as a localized ray data stored facility for one or more computing resources operating as intersection test cells.

The geometry element is tested for intersection with respective rays in each test cell 610a-610n, and an indication of intersection is output from each test cell 610a-610n for receipt by write back 660. Depending on the nature of the geometry element tested, write back 660 performs one of two different functions. Where test cells 610a-610n were testing a primitive for intersection, write back 660 outputs indications of each ray that intersected the primitive being tested. Where test cells 610a-610n were testing an element of GAD, write back provides the outputs of test cells 610a-610n to instruction unit 665.

Instruction unit 665 operates to assemble future instructions that will instruct test cells in further intersection testing. Instruction unit 665 operates with test cell 610a-610n input specifying which rays intersected a given element of GAD, instruction cache 630 and with inputs from GAD input 670, as follows. With the inputs from test cells 610a-610n, instruction unit 665 determines, based on GAD inputs, elements of GAD that are connected to the element of GAD specified in the inputs from the test cells 610a-610n (i.e., instruction unit 665 determines what GAD elements should be tested next based on an intersection indicated for a given GAD element).

Instruction unit 665 determines whether an instruction stored in instruction cache 630 already exists for each element of GAD identified as connecting to the intersected element, and whether that instruction can accept any further ray references (i.e., are all data slots of the instruction filled?). Instruction unit 665 adds as many of the rays identified as intersecting in the test cell input to that instruction and creates other instructions sufficient for receiving the remaining ray references. Instruction unit 665 does this for each element of GAD identified as connecting with the element identified in the test cell input. Thus, after processing the test cell input (an intersection indication), rays identified as intersecting the same GAD element are each added to instructions specifying testing of the rays against elements of GAD connected to that same GAD element. The instructions created thereby may be stored in instruction cache 630.

Instructions may be organized in the instruction cache 630 based on the organization of the elements of GAD received from GAD input 670. Instruction unit 665 performs functions similar to logic 203a, in that both logic 203a and instruction unit 665 receive indications of what rays hit what GAD elements, grouping such rays together for future testing. The system of FIG. 6 is intended to be more general purpose, in that packets of rays for testing can be a type of packet from among many types for accomplishing different functions.

For example, GAD input 670 may provide a graph of GAD, where nodes of the graph represents elements of GAD, and pairs of nodes are connected by edges. The edges identify which nodes are connected to which other nodes, and instruction unit 665 may search instruction cache 630 by following edges connecting nodes, in order to identify which instructions are already in the cache for a given element of GAD, and where new rays may be added. Where multiple instructions exist for a given GAD element, they may be linked in a list, or otherwise ordered or associated with each other. Other methods, such as hashing a GAD element ID to identify potential locations in instruction cache 630 where relevant instructions may be found can also be implemented.

Instructions can also reference a node of GAD under test, such that the instruction would cause fetching of connected nodes of GAD, in response to the instruction being issued and decoded (as opposed to storing instructions for each connected node). Each such connected node can be streamed through test cells 610a-610n for test with respective rays maintained in each test cell (i.e., ray data remains stationary in test cells while a plurality of GAD elements are provided to each of the test cells, and each test cell tests its ray against each GAD element in sequence).

Thus, a processor implemented according to these examples would provide functionality to obtain or otherwise create instructions that collect rays identified for intersection with a first node for intersection test against connected nodes. As with the examples described above, if the GAD provided to processor 605 is hierarchical, then the graph of GAD may be traversed in hierarchical order.

The example connections and sources of GAD are exemplary and other arrangements are possible. For example, memory 615 may be a source for GAD elements, however it continues to be preferable to store rays (i.e., data defining the rays, and other data, such as a current closest primitive intersection found) in a faster memory than geometry data, where a given processing architecture permits. Also, in the above example, next nodes (i.e., next acceleration elements, or primitives) to be tested based on testing results were determined and packets were instantiated per geometric shape responsively. Other implementations apparent from these disclosures can include instantiating packets per "child" node upon determining to initiate testing of children of a given node, which creates child instructions/collections later in time.

Figure 7:
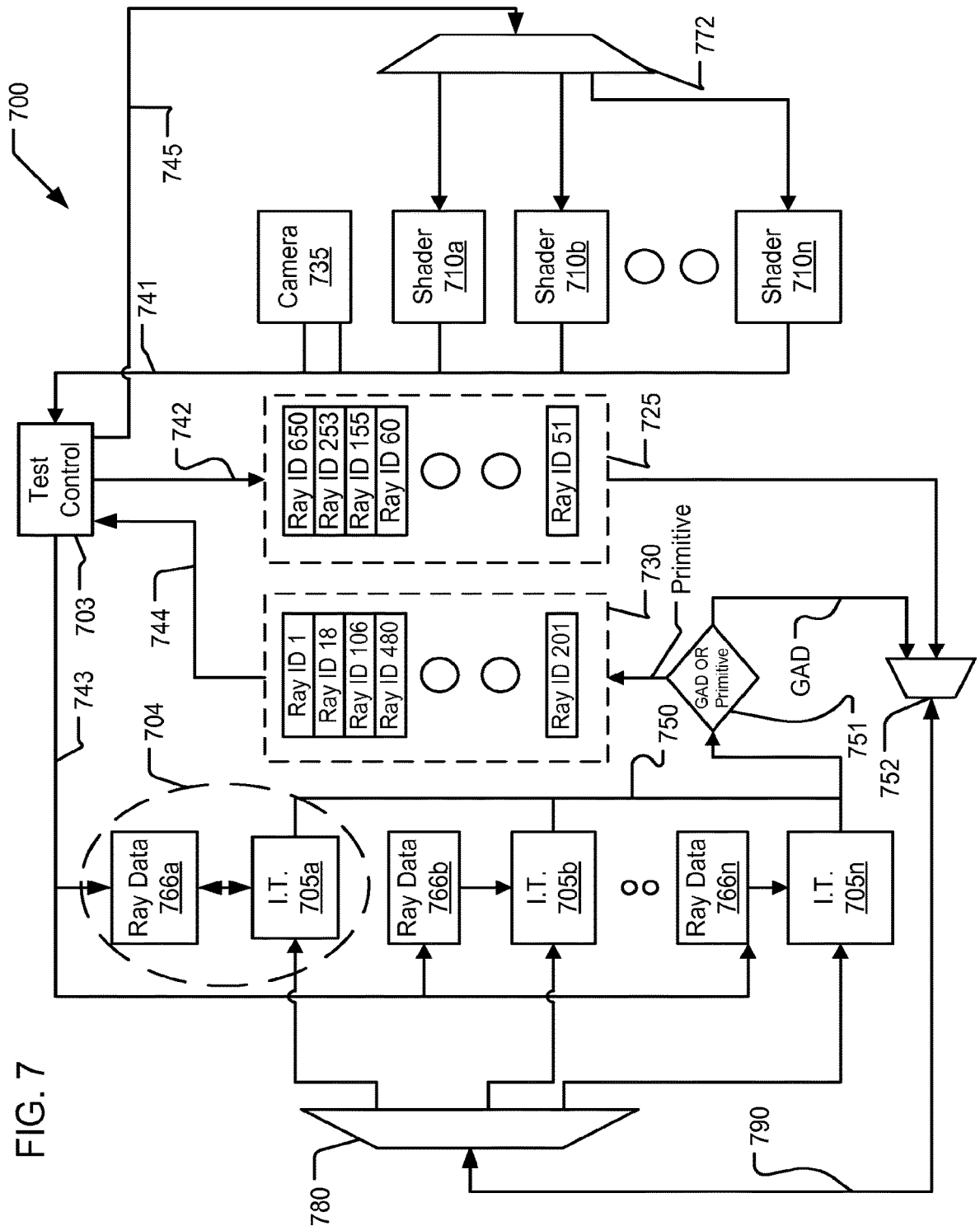
FIG. 7 illustrates a system architecture implementing aspects of disclosures from FIGS. 1-6, comprising intersection testing resources and shading resources coupled by queues.

FIG. 7 further illustrates aspects of ray tracing systems (e.g. system 700) that can use queues for decoupling operation of intersection testing and ray shading, including generation of new rays, including camera rays. System 700 allows submission of rays for intersection testing and their completion of intersection testing, resulting in output for shading, in different orders, like the systems of FIGS. 1-6. Likewise, the intersection testing resources can proceed with intersection testing rays without stalling for shading resolution of a previously-identified intersection.

FIG. 7 illustrates a plurality of intersection testing resources (ITRs) 705a-705n, each respectively coupled to ray data storage 766a-766n, which store data defining rays to be tested for intersection in that resource. Each group of ITR and ray data storage (e.g., ray data 766a and ITR 705a) can be viewed as a localized grouping of test resources and ray data storage, e.g., grouping 704 illustrated, which is similar to previous groupings, e.g., groupings 578 and 579 of FIG. 5.

Ray data storage 766a-766n can be memories, such as private L1 caches, shared or mapped portions of L2 caches, or the like. As in previous examples, it is preferable to devote fast memory to storing ray data locally to specific processing resources, rather than geometry data. The localized storage of ray data is made easier by intersection testing algorithms used here, which increase a length of time a ray can be stored in a more localized, faster memory, which reduces the amount of thrashing of this smaller memory. As such, this ray storage can be viewed as being quasistatic, in that data for a given ray is usually stored in the same local memory until it has completed intersection testing in the scene.

Data defining rays is loaded via output 743 from test control 703 (similar to logic 203b, et al. in previous figures). Test control 703 receives inputs comprising identifiers for rays that have completed intersection testing in the ITRs 705a-705n through ray complete queue 730.

Queue 730 stores ray identifiers (some example Ray IDs 1, 18, 106, and 480 are illustrated). Queue 730 gets inputs from ITRs 705a-705n, that represent rays completing testing in the scene, having been tested to identify a closest intersection that it intersected. As such, queue 730 can be fed from a decision point 751 that can determine whether a given output from ITRs 705a-705n represents information for a GAD element or a closest possible primitive intersection (useful where ITRs 705a-705n can test both types of shapes).

Decision point 751 thus represents two types of intersection control functions described previously. One is that GAD/ray intersections are retained/managed closer to the intersection testers; the other is that only closest detected primitive/ray intersections are outputted for shading. If in some previous architectures, separate test cells are used for each, then the decision point may only track when a closest possible primitive intersection has been found.

From decision point 751, GAD results enter mux 752 that also receives ray ID inputs from queue 725, which stores ray IDs received from input 742, which in turn is fed from ray control 703. Ray control 703 populates input 742 with ray identifiers corresponding to ray information being supplied to ray data 766a-766n through output 743 from test control 703. Thus, data defining rays identified in queue 725 (by ray identifiers (ray IDs)) are provided via output 743 to ray data 766a-766n for storage in those memories. Examples of how ray IDs can be formed are provided below.

Both queues 730 and 725 illustrate a series of identifiers for rays (Ray IDs). However, as will be described below, rays generally are tested concurrently against a given geometric shape. Thus, queue 725 in such cases preferably would be storing ray IDs for a packet of ray IDs, and so the queue 730 also can represent a series of entries each having a number of ray IDs associated with a given shape.

By particular example, algorithms driving this architecture generally wait until it has been determined that a number of rays need to be tested against a given shape, then such testing is performed and results outputted, so it is generally contemplated that numbers of rays will be completing testing and beginning testing around the same time. Beneficially, these completing rays can be completely unrelated to each other in terms of how or when they were instantiated initially, or by what path they traversed an acceleration hierarchy. Conversely, queue 725 can be considered to contain groups or packets of new rays that are to be tested against a default GAD element of the scene, e.g., a root node of a hierarchy of GAD elements.

Such new rays come from ray sources, including a camera shader 735, and other shaders 710a-710n. Camera shader 735 is identified separately, as it generates primary rays to be tested in the scene. Shaders 710a-710n run on computing resources, such as in threads, and/or cores of one or more processors and represent execution of instructions or other logic specifying what response is appropriate to an identified intersection between a ray and a primitive. Usually, such response is determined at least in part by shading code associated with the primitive; various other influences and considerations can be accounted for.

Shaders 710a-710n receive identifiers of rays and primitives intersected through distribution point 772, which receives such ray data from output 745 of test control 703 (see FIG. 8a). Distribution point 772 can be used to provide such ray data to compute resources having availability to execute code for a given primitive, and so any means for such an availability determination can be used to control such distribution, including load measurements, flags set by the compute resources, a decoupling FIFO with a fullness indicator, or even a round robin or pseudo random distribution scheme can be used.

Outputs of these shaders 710a-710n can include other rays, called secondary rays for convenience (outputs from camera 735 also include rays). In this example, such rays would, at this point, include at least origin and direction data defining them, but would not at this point need to have an associated ray ID, which preferably will be provided by test control 703.

As can be discerned, test control 703 can monitor ray state in the intersection testing resources, allocating new rays to replace rays in ray data 766a-766n that have completed, as described in more detail with respect to FIGS. 8-9. Distribution of ray IDs to ITRs 705a-705n is performed by distributor 780, described in detail with respect to FIG. 10. Such distribution is primarily controlled by which memories of ray data 766a-766n store data defining a ray identified by a given identifier. Also, distributor 780 controls when ray IDs are obtained from queue 725, based on considerations such as collection readiness, as also described with respect to FIG. 10.

Now, turning to FIG. 8a, there is illustrated a portion of test control 703, comprising banks of memory associated with each of Ray Data 766a-766n, each bank having slots for populating with ray data, and addressable by memory addresses. FIG. 8a illustrates that output 744 from ray complete queue 730 includes ray identifiers 1, 18, 106, and 480, each of which have spaces allocated in memory 803. Such spaces are allowed to be overwritten/filled in response to reception of these ray identifiers from output 744. Output 745 to distribution point 772 includes ray data for use in shading. Output 745 may also include other data. In practice, memory 803 may be implemented in a memory used also by other processes, such as processes executing shaders 710a-710n. In such cases, output 745 can represent (or be implemented by) retrieval of such data from memory 803 by a computing resource.

A variety of communication links were identified in FIG. 7, such as links 741, 742, 743, 744, 745, 750, 790; any of these links can be implemented according to an overall architecture implementation, and can include shared memory regions, physical links, virtual channels established over expansion busses, shared register spaces, and so on.

FIG. 8b illustrates that data for new rays comes in from output 741 (from shading operations, e.g., such as camera shader 735). Such ray data at least includes ray origin and direction information. Now, test control 703 assigns these new rays to locations in memory 803 that are for different of the ray data 766a-766n. The identifier associated with each ray origin and direction depends on where it was stored. Thus, input 742 (input with respect to queue 725) receives ray identifiers determined on that basis. Also, output 743 includes both the ray identifiers and their associated origin and direction information stored in memory 803. The assignment of ray IDs illustrated in FIGS. 8a and 8b is convenient, in that a ray ID can be used to index a memory to identify relevant data, but any other kind of identifier for a ray can be used, so long as ultimately an identification of ray data in ITRs 705a-705n and in memory 803 can be effected using the ray identifying data.

FIG. 9a illustrates an example of such an alternative where a content associative memory 910 maintains keys 905 that are each associated with different ray data.

FIG. 9b illustrates that within each ray data 766a-766n, slots are provided to accept ray data from test control 703 via interface 743. These slots can be further subdivided into multiple banks, or interleaved, and/or other cache organization mechanisms for allowing easier retrieval of data from the cache. Where rays need to be distributed for storage herein, such distribution can proceed based on least significant bits of a ray ID or of a hash of the ray ID, or by modulo division with a number of banks into which distribution is to occur, by round robin queuing, or any other distribution mechanism that can be used to distribute ray data to the memories. Within any given portion, ray data also can be sorted based on ray ID.

In sum, FIGS. 7-9b illustrate an architecture where rays to be tested are collected by control logic, and assigned identifiers that preferably are based on memory locations at which ray definition data will be stored in respective caches coupled to different intersection testing resources. Primitive intersection testing results come from these testing resources as they complete, and the test control logic can then reassign memory locations for those completed rays to new rays needing to be tested. Completed rays can be shared on any of a plurality of different intersection processing/shading resources, which can generate further rays to be tested. Rays are generally cycled through the intersection testing resources throughout traversal of an acceleration structure and until a closest primitive intersection is identified (or until it is determined that the ray fails to intersect anything other than a scene background).

Figure 10:
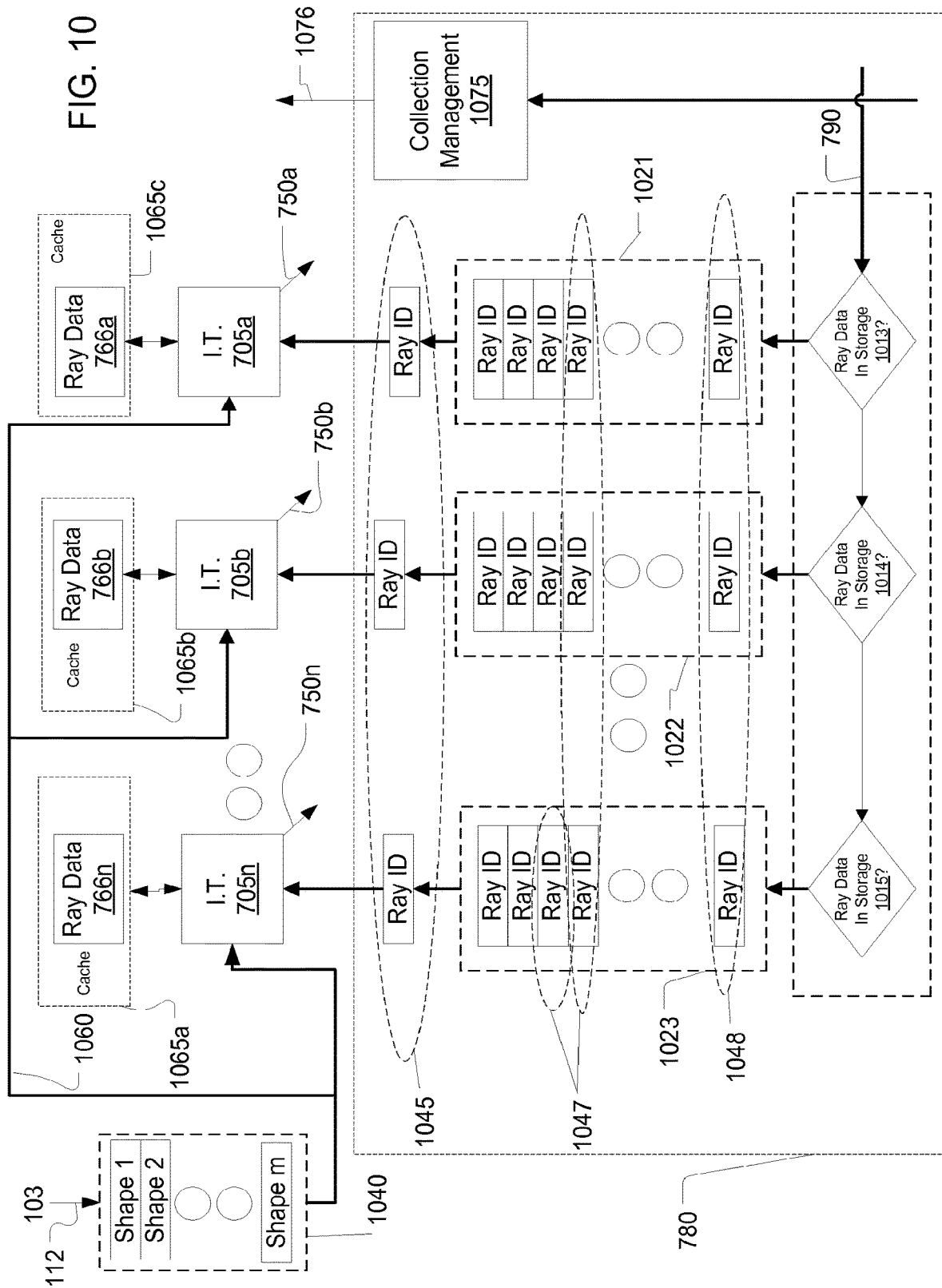
FIG. 10 illustrates aspects of intersection testing control and shape distribution among plural intersection testing resources that can be implemented in systems of FIGS. 1-7.

Turning to FIG. 10, there is illustrated further architecture aspects for rendering systems. One aspect in FIG. 10 is that ray data can be stored in respective cache memories coupled to processors configured for intersection testing. Another aspect is how distributor 780 can interface with ITRs 705a-705n. A further aspect illustrated is how shape data for testing can be provided to the intersection testers.

Distributor 780 receives ray identifiers from mux 752 (FIG. 7) through communication link 790 (implemented as hardware, interprocess or interthread communication, or the like). These ray IDs are each transmitted to collection management 1075, where an association between the ray IDs and the respective GAD element bounding objects to be tested next is maintained. The ray IDs also can be distributed by decisions 1013, 1014 and 1015 among queues 1021, 1022, and 1023 where the ray IDs await a determination from collection management and storage 1075 to test their collection. For example, collection 1045 has been determined ready to test and the ray IDs are dispatched to respective ITRs 705a-705n whose caches 1065a-1065n contain data for each such ray ID. Collection management 1075 also may have an interface to a memory storing GAD element data and/or primitive data in order to initiate retrieval of the geometric shapes needed for testing.

These shapes are arriving in a queue 1040 from storage 103 (FIG. 1) via link 112 (for example). These shapes were identified based on association with an element of GAD associated with a given collection. For example, in a case of hierarchical GAD, these shapes can be children of a parent GAD element. Each ITR can test its ray serially against the shapes from queue 1040. Thus, highest throughput is achieved when rays of a given collection are equally distributed among caches 1065a-1065n, and collection management 1075 can update collections based on results of testing a given ray collection most easily. When multiple rays of a given collection are in one cache, then the other intersection testers can stall, or they can test rays from a next collection. A maximum number of out of order tests can be accommodated before collection testing synchronization is again required.

Outputs are produced at outputs 750a-750n (that can be components of link 750 (FIG. 7), which are provided to decision point 751 (FIG. 7). As discussed above, this architecture provides for ITRs testing any shape (i.e., either primitives or GAD elements). Also, decision point 751, coupled with collection management 1075, represents that a result of GAD intersection testing includes a determination that a given ray hit a given GAD element, which causes an identified ray to be added to a collection corresponding to that GAD element. Thus, another implementations can include providing GAD testing results directly to collection management 1075. More generally, the described examples exemplify potential flow of information, and other flows would be apparent therefrom.

Other aspects to note are that more than one ray ID for a given ray collection can be stored in any of queues 1021, 1022, 1023 (shown by collection 1047). In such cases, the ITR for that queue can test both rays, and output results for the second test (or however many subsequent tests) as they become available. Decision point 751 can wait for all results of a collection to be assembled, or the "straggler" result can be propagated as available.

In sum, FIG. 10 illustrates a system organization allowing a packet of ray identifiers associated with one or more shapes to be distributed into queues for a plurality of testing resources, that each store a subset of ray data. Each test resource fetches ray data identified by each ray identifier against a shape loaded to the test resource. Preferably, the shapes can be streamed sequentially through all the test resources concurrently. The shapes can be identified as a sequence of children starting at an address in a main memory. Thus, FIG. 10 illustrates a system organization where a shape generally is tested concurrently against multiple rays.

However, other examples provide for testing a shape sequentially in a series of different intersection testing resources, where shape data and a packet of ray identifiers travel among intersection testing resources. By having a plurality of packets in flight, throughput of testing is increased. Examples according to this approach are described below.

Figure 11:
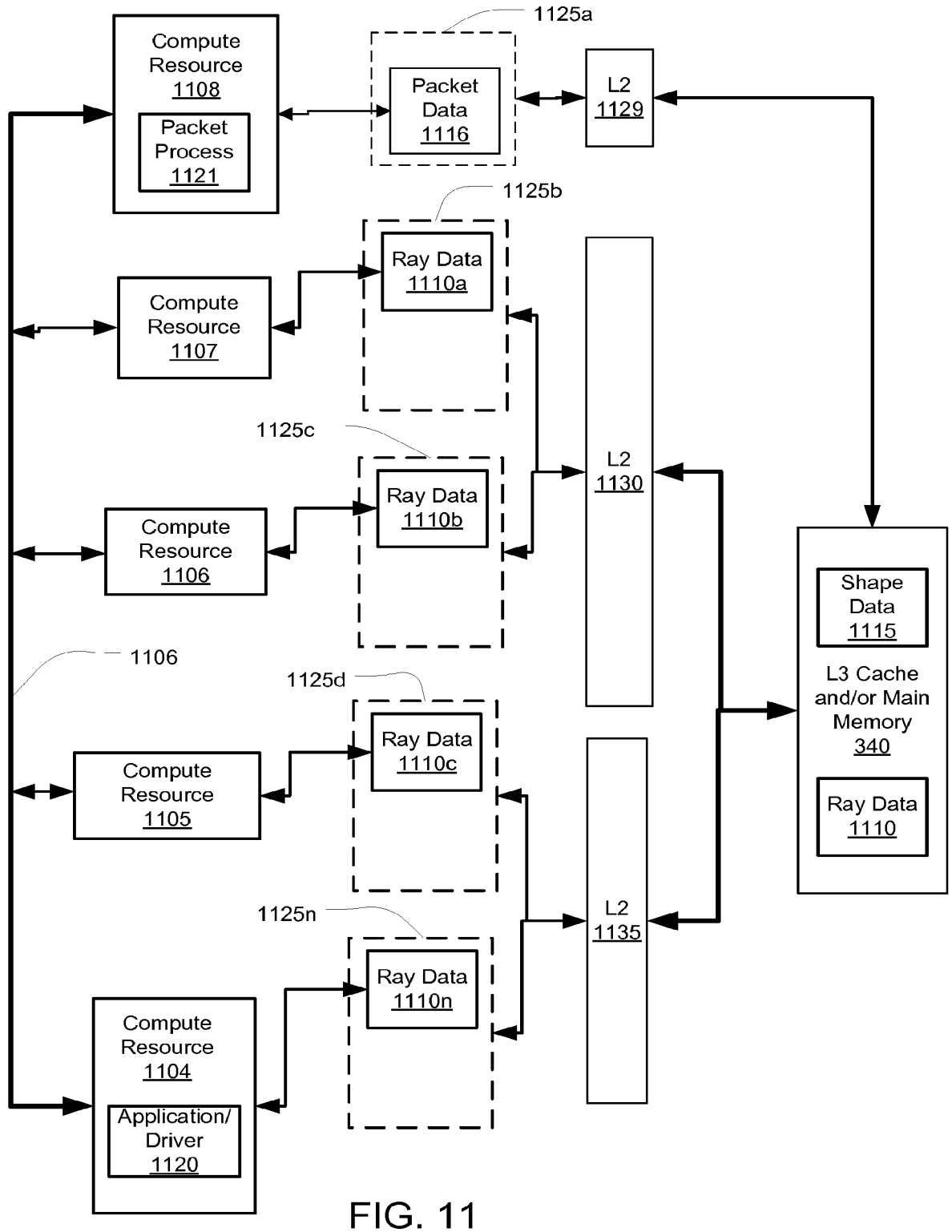
FIG. 11 illustrates a multiprocessor architecture in which aspects of systems of FIGS. 1-10 can be implemented when using the architecture for ray tracing.

FIG. 11 illustrates a first example of a computer architecture in which a ring bus arrangement of a plurality of computer resources 1104-1108 can be implemented. Each computer resource has access to a private L1 cache 1125a-1125n, which, for any compute resource used for intersection testing, contains ray data that will be intersection tested with geometric shapes provided to that computing resource from shape data storage 1115 in memory 340. Communication among compute resources 1104-1108 can occur by bus 1106, which may comprise a plurality of point to point links or any other architecture available for such inter-processor communication.

If compute resources share certain memory structures, such as L2 caches 1130 and 1135, then communication between those compute resources, e.g., compute resources 1107 and 1106 sharing L2 cache 1130, may communicate with each other through that cache for some purposes. Additionally, a copy of data for rays being tested in the system may be maintained in ray data 1110, for distribution of subsets thereof among ray data 1110a-1110n, such ray data may be transmitted through L2 1130 and L2 1135, and larger portions thereof also may be stored in those L2 caches (as described below). Shape data 1115 also may reside in memory 340, and temporary reside in one or more of L2 1130 1135 and any of the caches 1125a-1125n. However, ray data stored in such caches is protected from being overwritten by such shape data, and an amount of space allocated for such shapes generally is limited to what is useful for ray packets currently identified as being ready for test, enough to shield latency to shape data 1115, without attempting to keep shape data around without any indication of when it will be used next in testing. In other words, it is preferred to avoid using typical cache management algorithms, such as least recently used replacement, for ray data.

FIG. 11 also illustrates that an application and/or a driver 1120 can execute on compute resource 1104, in addition to intersection testing. Also, a ray process 1121 can execute on compute resource 1108, and packet data 1116 can be stored in cache 1125a for use by the packet process 1121. Other packet data can be stored in L2 1129, but it is preferred to store packet data in the fastest possible memory, similar to ray data. The packet process performs many of the same functions that collection and other management logic performed in prior figures, namely, keeping track of which rays have intersected which GAD elements, and selecting GAD elements which are ready to test, e.g., by virtue of having enough rays ready to be tested against children of the intersected GAD element, for example.

Since in this example, packet process 1121 is centralized, it would operate by issuing a packet containing a plurality of ray identifiers and either a reference to shape(s) or data for shape(s) to be tested for intersection with the identified rays. Each compute resource 1104-1107 performing intersection testing receives the packet. For example, sequentially in a plurality of point to point links (explained further below) or generally at the same time in a shared bus type medium (which can be similar to the architecture of FIG. 10). Each compute resource 1104-1107 determines whether its localized ray data 1110a-1110n stores data for any ray identified in the packet, and if so retrieves data for that ray, tests it and outputs results.

Since results for GAD element intersections are tracked by packet process 1121, any communication mechanism to get such results back to packet process 1121 is acceptable. Such mechanism can be selected based on the overall architecture of the system. Some examples approaches are illustrated below, and can include a separate indication for each intersection found, or allowing each test resource to populate a circulating packet with intersection results.

Figure 12:
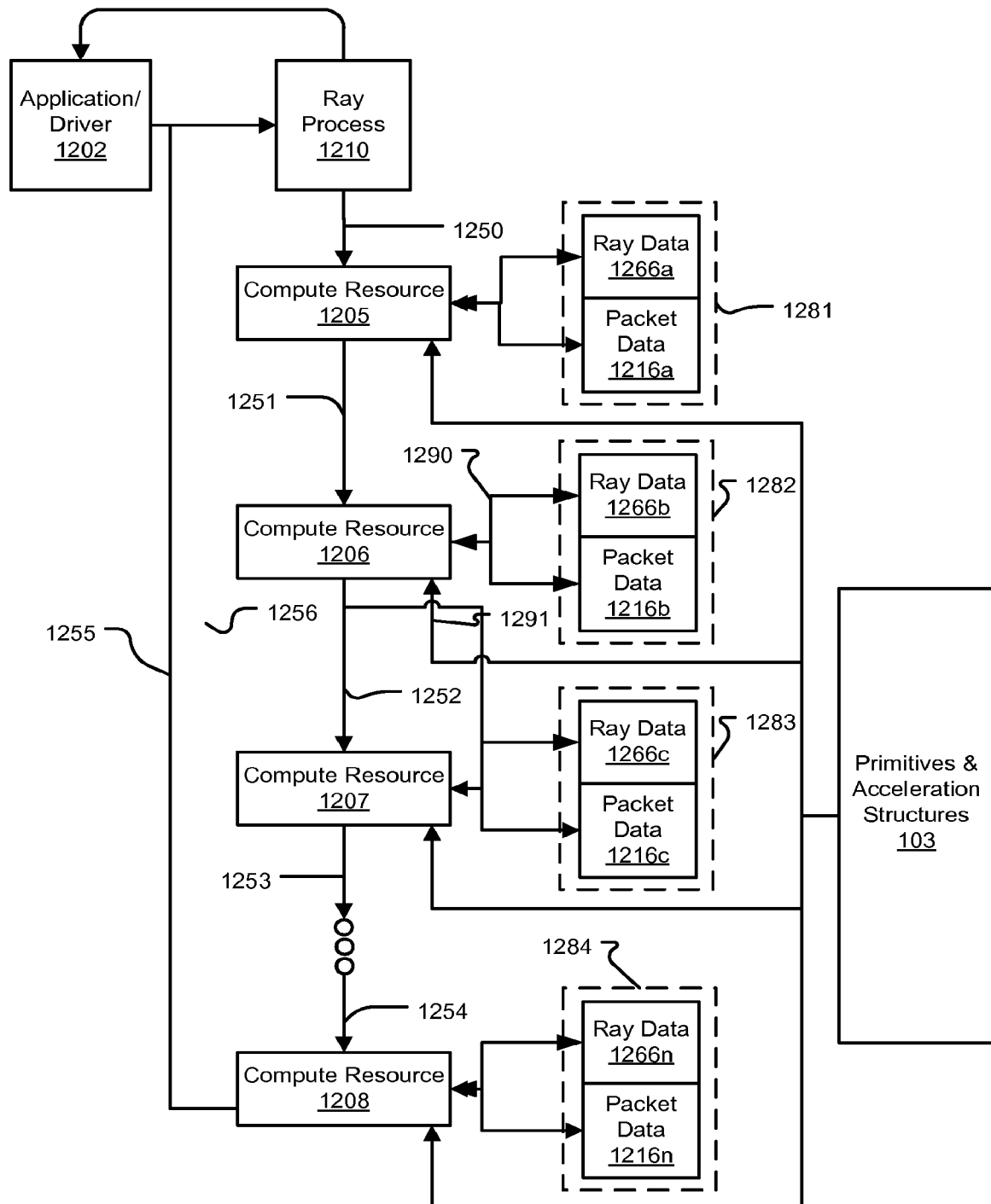
FIG. 12 illustrates an organization of plural computing resources with inter-resource communication and localized ray data storage that can effect an implementation of disclosures from FIGS. 1-11.

FIG. 12 illustrates a further example of an organization of compute resources 1205-1208, associated caches 1281-1284, which each store ray data 1266a-1266n and packet data 1216a-1216n. Each compute resource 1205-1208 is connected to at least one other compute resource by queues 1251-1254. Ray process 1210 provides inputs through queue 1250 to compute resource 1205. Ray process 1210 communicates with application/driver 1202. An output 1255 from compute resource 1208 communicates with ray process 1210. Another output 1256 communicates with compute resource 1205. Primitive and GAD storage 103 provides read access to that shape data for compute resources 1205-1208.

Ray process 1210 receives or creates rays for testing, and forms packets containing ray identifiers and ray data for the identified rays. The packets are passed through the queues 1250-1254 to each of the compute resources 1205-1208. Each compute resource 1205-1208 takes a portion of the rays in a given packet, in some examples, just one ray, and stores its portion of rays in its ray data 1266a-1266n. Other examples can include sending packets destined for a particular compute resource 1205-1208, such that ray process 1210 determines what ray data will be stored in what localized ray data 1266a-1266n.

After rays are loaded in localized storage, they are thereafter identified by packets containing ray IDs only, without origin and direction data. Such packets also contain either a reference to a shape or data for a shape to be tested against rays identified in that packet. In some examples, data for forming such packets is distributed among the localized memories 1281-1284 of compute resources 1205-1208. Thus, each of the compute resources 1205-1208 maintain a portion of the packet data for rays being tested in the system at a given time, such that information concerning what rays are to be tested against what shapes next is distributed. Thus, each compute resource 1205-1208 can issue packets of ray IDs and shape information to initiate testing of a collection ready for test.

Each packet makes a round through the queues and computing resources, and then is forwarded back to the originating compute resource with the results of intersection testing populated in it. In one implementation, each compute resource 1205-1208 fetches shape data for packets that it will issue. For example, if compute resource 1205 has a packet ready for test (e.g., a collection of rays for a given GAD element), then the compute resource can fetch shapes to be tested by such association (e.g., children of the GAD element), make a packet having data for each shape, and send each packet out of queue 1251.

In turn, compute resource 1205 receives each packet that it emitted, after the packet has traveled through the other compute resources. When received, each packet is populated with results of testing a shape in that packet (reference or definitional data) for intersection with rays identified in the packet that were/are stored in the other compute resources 1206-1208. Compute resource 1205 can test any identified rays it has locally in ray data 1266a either before or after the other compute resources perform their testing. Thus, ray definition data can be distributed among a plurality of fast memories, coupled to intersection testing resources, and the testing results can be collected in a distributed manner.

Implementing an architecture in accordance with FIG. 12 may take into account various characteristics of a physical system being used. For example, queues were shown as sending packets in one direction. However, benefit may be realized by sending packets in two both directions (i.e., bidirectional queues or multiple queues). Also, FIG. 12 illustrates that packet data is dispersed among compute resources, allowing more dispersed memory accesses to more L2 caches, and potentially other ports to a larger memory, such as main memory 103.

If packet data were centralized, then a packet sent in one direction with a data reference can have data fetched by, for example, compute resource 1205, and a packet sent in the other direction with a data reference can have data fetched by compute resource 1208. This situation can be generalized to provide any entry point into such a ringbus architecture (unidirectional or bidirectional).

As evident from the disclosure, the queues described may include one or more queues that are for introducing new rays for intersection testing into a system comprising a plurality of intersection testing resources, and queues that interconnect the intersection testing resources with each other. In some cases, queues that introduce new rays can contain ray definition data (e.g., queues that wait to store data in caches connected to intersection testing resources). Such queues can be implemented as lists in a main memory storing ray definition data. Queues interconnecting intersection testing resources for passing packets preferably include only ray identifiers and not ray definition data.

FIG. 13 illustrates a portion of a potential implementation of system 1200, where compute resources may be implemented with cores of a chip, such that compute resource 1205 is one core and compute resource 1206 is another, where queue 1251 is intercore communication. Also illustrates is an intermediate L2 cache 1305 that can store ray data, as well as shape data. As described with respect to previous figures L2 cache 1305 may store some portion of scene geometry and acceleration data, so long as by storing such data, there is not an increase in thrashing of ray data (i.e., ray data preferably is given priority in cache storage).

FIGS. 14a-14c each illustrate various relationships that queues according to various implementations of exemplary systems can take. Generally, inter-compute resource communication does not need to be serial or 1:1. For example, FIG. 14a illustrates a one input 1404 can feed both queues 1405 and 1406, which can each be dedicated to one compute 1407 and 1408 respectively. For example, where compute 1407 and 1408 are implemented on a single physical chip, then input 1404 can be a chip level input and each queue 1405 1406 can be for a particular core.

FIG. 14b illustrates that a single input can feed multiple cores, which each can feed compute 1407 1408, which each also can send data to an opposite queue 1406 1405 respectively. FIG. 14c illustrates that queue 1411 can receive input 1410, and provide outputs to both compute 1407 and 1408. Thus, FIGS. 14a-14c illustrate that various queuing strategies can be implemented for passing packets according to these aspects.

FIG. 15 is for illustrating that where multiple levels of cache hierarchy exist (e.g., level 1 caches 1502 and 1503, and level 2 cache 1504, various combinations of ray data can be provided. For example, ray data 1507 can include disjoint subsets of ray data 1505 and 1506, as well as other ray data not present in either 1505 or 1506. Ray data 1505 and 1506 can vary dynamically, such as where one queue feeds more than one compute resource (FIG. 14c), then ray data may reflect a dynamic assignment of a ray stored in ray data 1507 to either ray data 1505 or 1506.

Figure 16:
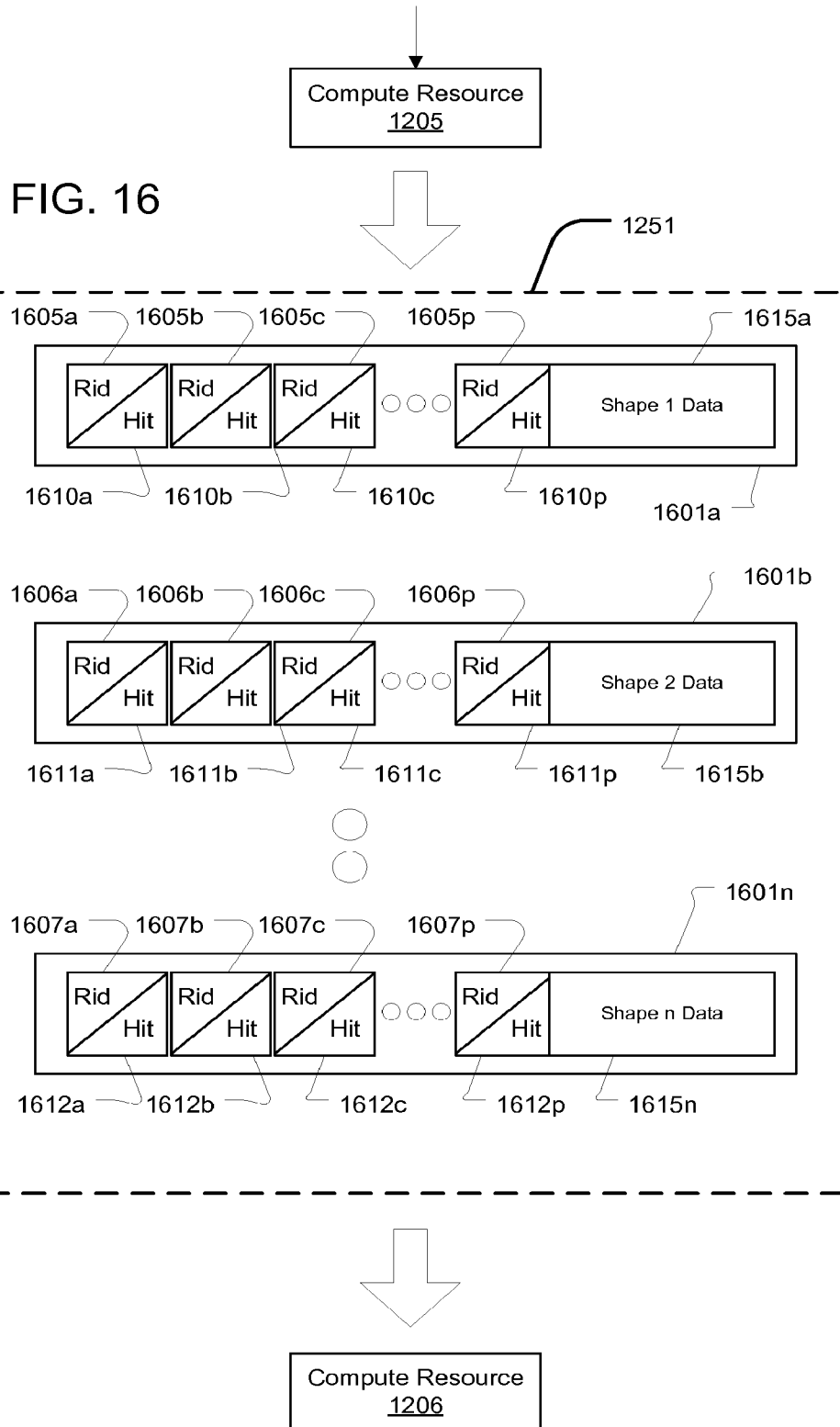
FIG. 16 gives an example of data in packets that can be present in a queue per these disclosures.

FIG. 16 illustrates in more detail an example implementation of a queue 1251 and data that it can store. Packets 1601a-1601n are illustrated, each having respective ray identifiers 1605a-1605p, 1606a-1606p, and 1607a-1607p, and corresponding hit information fields 1610a-1610p, 1611a-1611p, and 1612a-1612p. Packet 1601a contains data 1615a for shape 1, packet 1601b contains data 1615b for shape 2, and packet 1601n contains data 1615n for shape n. As can be discerned queue 1251 is fed by compute resource 1205 and read by compute resource 1206. Of course, various other queuing strategies, some of which are illustrated in FIGS. 14a-14c can be implemented.

Queuing as that term is used here does not imply a first in/first out requirement for rays tested in any given compute resource. On average, rays identified in any given packet will be about evenly distributed among localized ray storage for different compute resources, such that any given packet should find its rays distributed among a number of compute resources, such that parallelism is achieved for each packet. Where a number of rays for one packet need to be tested in one compute resource, then a bubble may be formed where another compute resource has no ray to intersect for that packet. Such a bubble can be filled by other computation, including other intersection testing of another packet. In some examples, each compute resource can maintain state for multiple threads, and switch among threads on stall conditions for a given packet. So long as critical data for each intersection test between the packets can be maintained in registers, then a net throughput advantage should be realizable.

In partial summary of aspects of the operation of exemplary systems, each computer resource acts responsively to reception of a packet. When a packet arrives from an input queue for a particular computer resource, the compute resource examines the ray identifiers in that packet, and determines which rays identified in that packet have data stored for them in its respective memory. In other words, a packet can be formed with ray identifiers without a priori knowledge of which compute resource contains or has fast access to ray data for the rays identified in the packet. Moreover, each computer resource does not responsively attempt to obtain ray data for all rays identified in a packet, but rather only determines whether it has ray data in its local fast memory for any ray identified in a packet, and tests only that ray(s) for intersection with identified shape(s).

Figure 17:
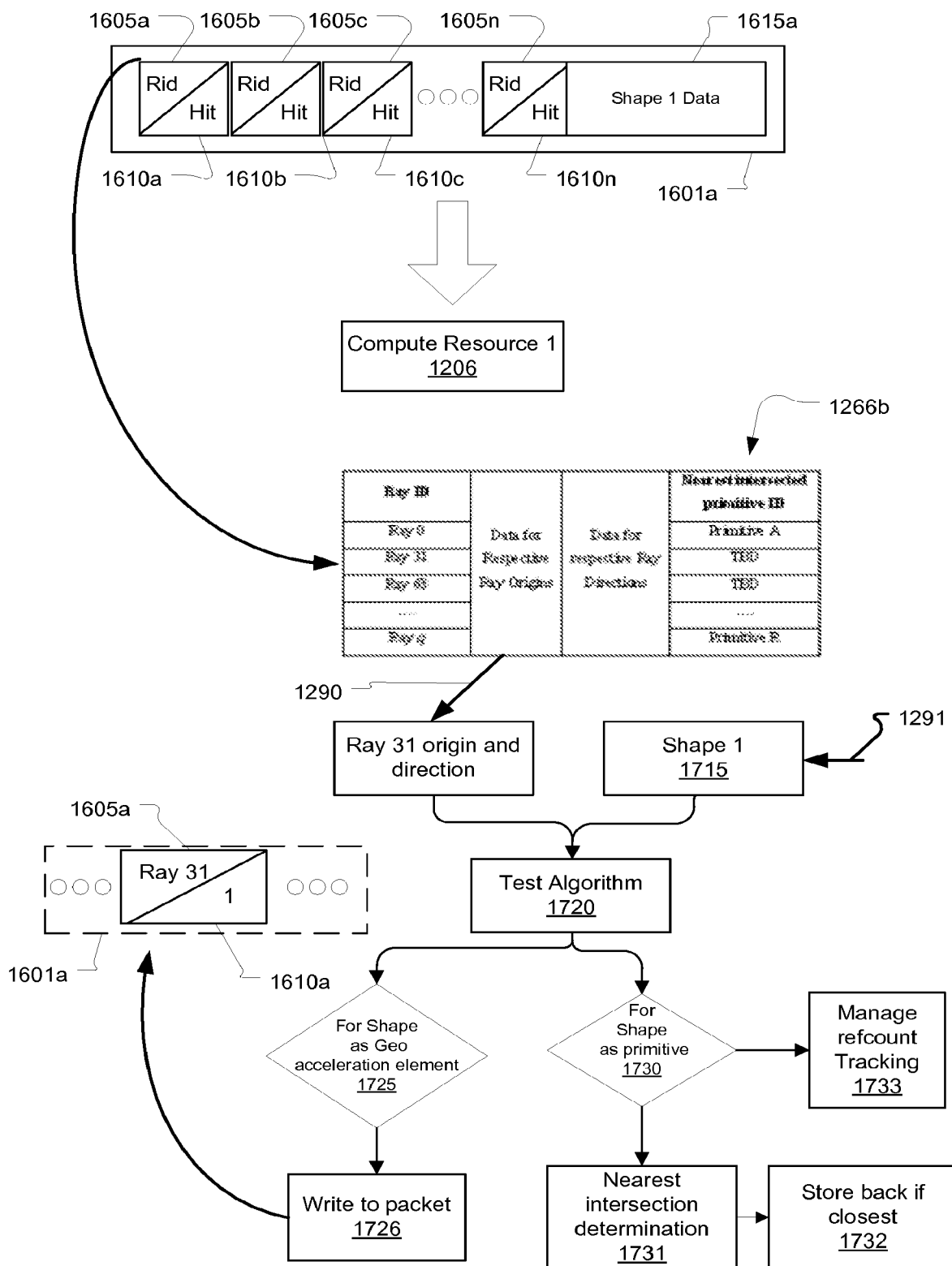
FIG. 17 provides disclosure relating to how a particular computing resource processes ray IDs from a packet, using locally available ray data in intersection testing, and writing back results of such testing.

FIG. 17 is for describing aspects of how a packet can be processed in an example computer resource. FIG. 17 illustrates that packet 1601*a* comes in to compute resource 1206. Computer resource 1206 queries its ray data, using the ray identifications from packet 1601*a* (e.g., say that ray 1605*a* has ray ID 31 and matches to ray ID 31 in ray data storage 1266*b*. The origin and direction associated with ray ID 31 is retrieved via 1290. Also shape data, if identified in the packet, is obtained 1715 from memory resource 1291 where it is currently stored. If shape data is provided in the packet, then that shape data is used directly. Then the ray 31 is tested 1720 for intersection with shape 1 (or shapes defined by the retrieved data).

If a shape tested was a GAD element (1725), then the effect of such intersection testing is to determine a smaller subset of scene primitives that may still have the possibility of intersecting the ray tested. Therefore, a positive hit result is written back 1726 to the packet in location 1610*a* for the ray identifier i.e., the identifier for ray 31. In some implementations, since an emitter of a packet can track what ray IDs were emitted and in what order in a packet, only results need be written back, with an implied order being the same as emission. Thus, after a pass through the testers, the packet emitting resource can process testing results.

On the other hand, if the shape tested was a primitive (1730), then a nearest primitive intersection determination (1731) can be conducted to determine whether this detected intersection is closer than any previous one. If it is, then the primitive intersected, and optionally the intersection distance can be stored with the packet or otherwise outputted. Since a given ray may be associated with multiple packets (i.e., with multiple GAD elements simultaneously), a count can be maintained 1733 for when each time a ray is associated with a GAD element, such that the count can be decremented each time so that it can be determined when the ray is no longer in any other packets still needing testing, allowing the memory devoted to that ray to be freed for admission of another ray.

In sum, data associated with each ray in its local fast storage preferably includes a closest detected primitive intersection identifier, that can include a primitive reference and a parameterized distance to that intersection. Other data associated with each ray includes a count of GAD element ray collections in which that ray exists. After each collection has been tested, the count is decremented, and when another collection is created, the count is incremented. When the count is zero, the primitive then identified as the closest intersected is the primitive determined to be intersected by that ray.

Figure 18A:
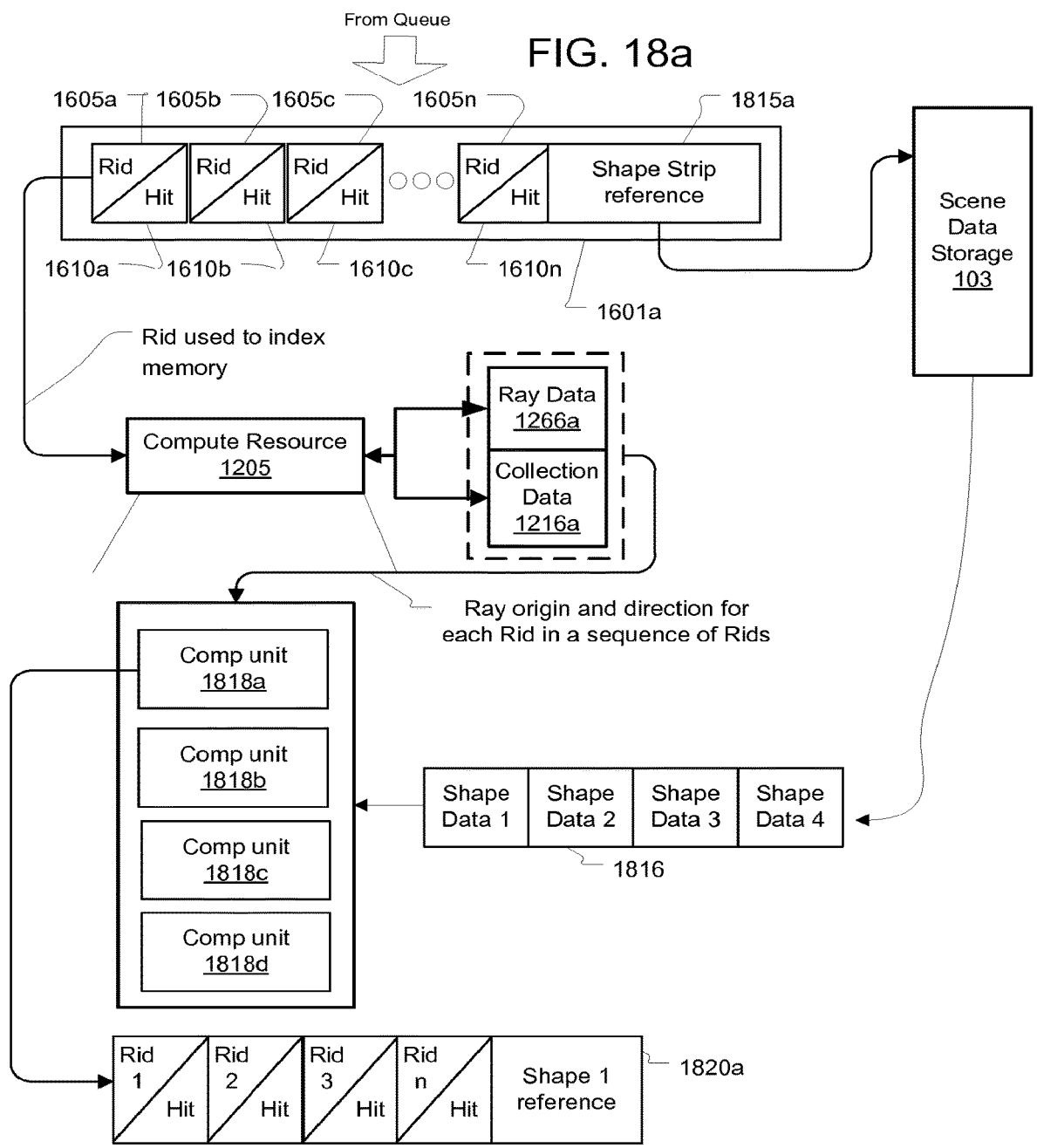
FIGS. 18a and 18b illustrate aspects of an example SIMD architecture processing packets of ray ID information.

FIG. 18*a* relates to an example Single Instruction Multiple Data (SIMD) architecture, which may be used in situations where a packet can identify a start of a strip of geometric shapes for testing. In an example, nodes of a GAD element graph are connected to one or more other nodes by edges, where each node is representative of an element of geometry acceleration data, such as a sphere or an axis aligned bounding box. In some examples, the graph is hierarchical, such that upon testing a given node, children of the given node are known to bound selections of primitives that are also bounded by the parent node. GAD elements ultimately will bound a selection of primitives.

In implementations, a string of acceleration elements, which are children of a given element can be identified by a memory address of the first element in the string. Then the architecture can provide a predetermined stride length to data at the start of the next element. A flag can be provided to indicate the end of a given string of elements which are children of a given node. Similarly, a strip of primitives can be identified by a start memory address with a known stride length to define the next primitive. More particularly to a triangle strip, two vertices in sequence can each define multiple triangles.

FIG. 18*a* is used for illustrating aspects of a SIMD architecture, akin to the SIMD architecture illustrated with respect to FIG. 6. In this example, a packet 1601*a* is received that contains multiple ray identifiers 1605*a*-1605*n*, optionally spaces for storing receiving intersection testing results 1610*a*-1610*n*, and shape data that can comprise shape definition data, an identifier for a shape, or an identifier 1815*a* for a beginning of a strip of shapes (e.g., triangle primitives) to be tested.

This example architecture may be appropriate where fewer, more powerful distinct processing resources with larger caches are used for intersection testing. Here, it would be expected that each distinct processing resource would have, on average, a number of rays in its local storage about equal to a number of rays that can be tested by a SIMD instruction (by contrast, FIG. 10 illustrated an example where each cache would preferably have one ray for each collection). For example, if four rays could be tested at a time in a SIMD execution unit, then it would be preferable to have statistically about four rays in a local storage for that SIMD unit in each packet being passed around. For example, if four distinct processing resources are provided, and each has a SIMD unit capable of testing four rays, then a packet can have about 16 rays referenced. Alternatively, a separate packet can be provided for each processing resource with a SIMD unit, such that for example, a packet can have 4 rays referenced where there is a 4× SIMD unit.

In one example, a first compute resource 1205 receiving packet 1601*a* can use identifier 1815*a* for obtaining data for the strip of shapes. Then each ray referenced in packet 1601*a* stored in ray data 1266*a* is tested in computation units 1818*a*-1818*d*. In the shape strip example, shape strip 1816 is retrieved, and comprises shapes 1-4. Each shape can be streamed through each computation unit 1818*a*-1818*d*, testing each for intersection with the ray loaded into that unit. For each shape of the strip, the computer resource can formulate packets (packet 1820 illustrated) that each contain results of testing the rays against one of the shapes.

Alternatively, separate bits can be provided in the results section for each ray to accept intersection results, and one packet can be passed. To avoid fetching again from slow memory, this approach is expected to be most appropriate where multiple compute resources can share an L2, or where a fetch by the first compute resource causes transfer of shape data to the other compute resources as well. For example, a DMA transaction can have multiple targets, each being a different compute resource needing to receive a given stream of shapes to be tested, is an example of an appropriate memory transaction model for some implementations. A principal consideration is to reduce fetching the same data from a main memory 103 more than once.

As discussed previously, each intersection testing resource determines which ray identifiers have ray data stored in its ray data storage. For any such rays, the ray origin and direction are retrieved. Previously, examples provided that a testing resource can test a given identified ray with a sequence of one or more identified shapes. However, it may be the case that a processing resource can test a plurality of shapes for intersection with a given ray concurrently without substantial extra latency, or a plurality of rays with one shape, or a combination of the two. In FIG. 18*a*, a SIMD architecture is shown wherein within one computing resource configured for intersection testing, each of four SIMD units can test a different ray for intersection with shapes sequentially provided to it. The sequence of shapes can be fetched based on a shape strip reference used as an index to scene data storage 340 to initiate retrieval of a series of shapes, which are each tested in a computation unit 123 or four.

Preferably, rays are collected into collections based on detected intersections between collected rays and elements of acceleration data. So, in this example, where a different ray is tested in each SIMD unit against 4 different shapes, the computing resource containing the SIMD units can reformat the results into packets of rays, each referencing a shape.

Other architectures using SIMD units can instead provide fetching a plurality of rays collected into a collection. As discussed, such rays are to be tested for intersection next against shapes related to the shape associated with the collection. For example, there may be 16 or 32 shapes connected to the collected-against shape. A first subset of these shapes can be loaded into different SIMD units, and the collected rays can be streamed through each SIMD unit (i.e., the same rays go through each SIMD unit at the same time). Results packets can be formed by each SIMD unit independently, and next shapes loaded into the SIMD units. The rays can then be recycled through the SIMD units. This process can continue until all related shapes have been tested against the collected rays.

Figure 18B:
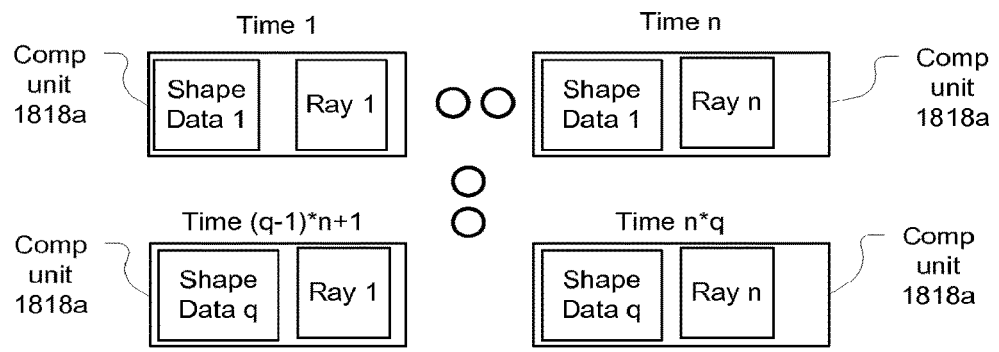

FIG. 18*b* illustrates a time-based progression for computation unit 1818*a* for such an example. At time 1, shape 1 and ray 1 are tested. There shapes are numbered from 1 to q and the rays from the collection are numbered 1 to n. At time n, shape 1 and ray n are tested. At the start of the next cycle (time q−1*n+1), the last shape begins testing in computation unit 1818*a*

Figure 19:
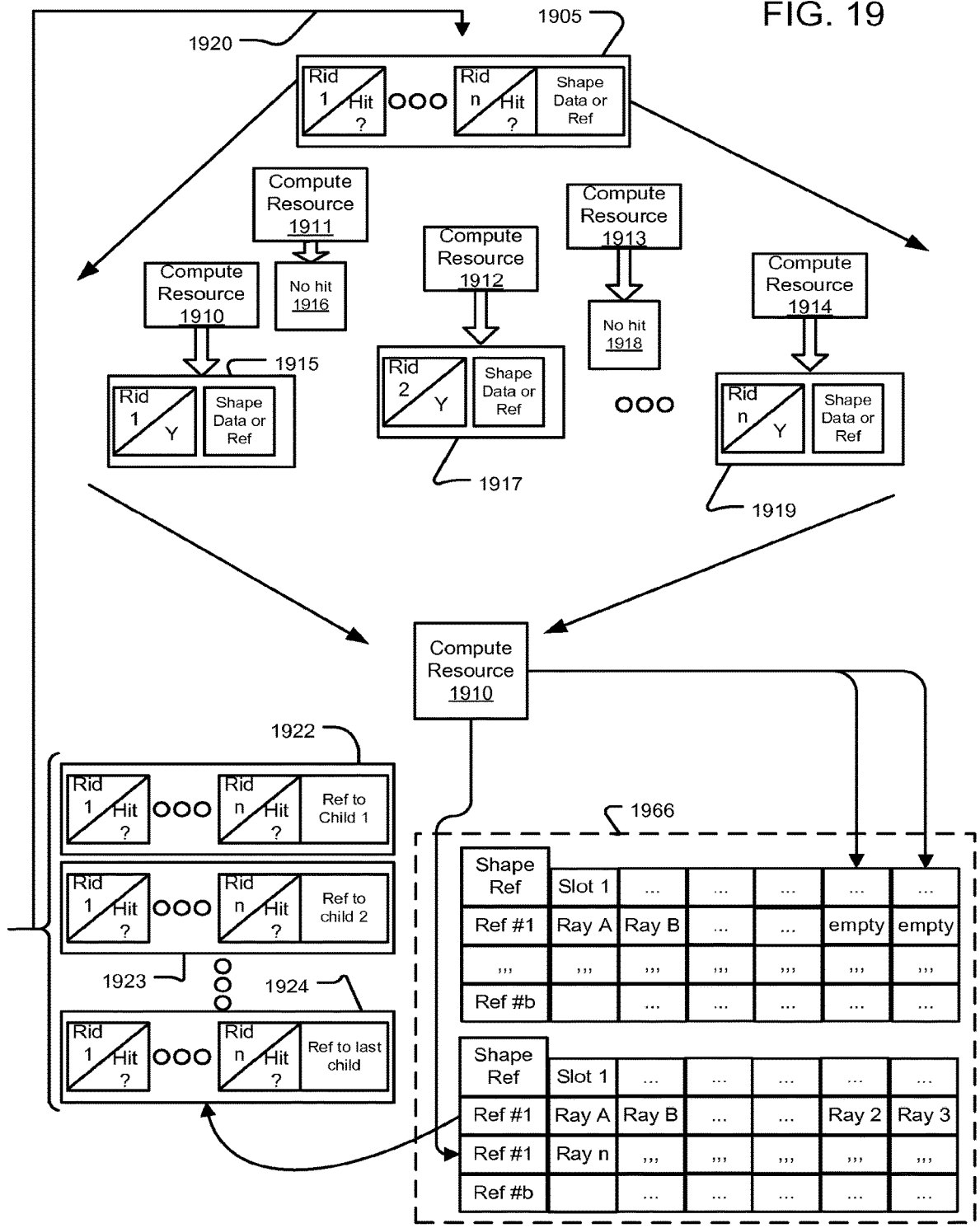
FIG. 19 illustrates a concept of dispersing ray identifiers, testing rays, and coalescing testing results into further packets for further testing.

FIG. 19 illustrates aspects of how a packet 1905 can be dispersed for intersection testing among computing resources and testing results that are each ultimately coalesced in a compute resource 1910 that maintains a memory for rays of packets associated with the shape identified 1905. FIG. 19 illustrates an example system state during processing. In particular, compute resources 1910-1914 each have received ray ID information for a ray stored in a memory accessible to that compute resource, have tested the identified shape for intersection and have outputted results 1915-1919, which includes identified hits 1915, 1917, 1919. Either hit or miss can be a default behavior, such that a miss for example would not be indicated by a positive value, or the default value in the packet can be set to miss. After the testing, compute resource 1910 collects at least the hit information; here compute resource 1910 could be managing all packet information in the testing system, or a subset thereof, including for this particular shape.

An example organization of a memory 1966 shows a logical organization of shape references mapped to a number of ray IDs: ray A, B, etc. Also illustrated is that some slots for the row related to Ref #1 (i.e., a reference to the shape under test) are empty. Thus, when compute resource 1910 receives hit results, it first populates remaining empty slots of the given Ref #1 collection, then it is illustrated in 1966 that Ray n begins a new packet for Ref #1 within memory 1966. Now, since the packet for Ref #1 is full, this packet can be determined ready for test. In some examples, child GAD elements of the shape referenced by Ref #1 are fetched, and a packet is formed with all the rays associated with Ref #1 in each packet. For example, there could be 32 children of Ref #1, and thus, 32 packets could be formed, with packets 1922-1924 illustrated. In some examples, compute resource 1910 can fetch data defining the child shapes and store that data in packets 1922-1924. Alternatively, references allowing other compute resources to fetch such data can be provided.

In some cases, compute resource 1910 may also be storing a ray identified within the packets created, and so may first test that ray before sending the packets out. In such cases, compute resource 1910 may store the shape data already fetched in the sent out packets. As discussed with respect to FIG. 12, implementations may allow sending such packets to one or more other compute resources, e.g., bi-directional queuing, or any-to-any, etc.

Figure 20:
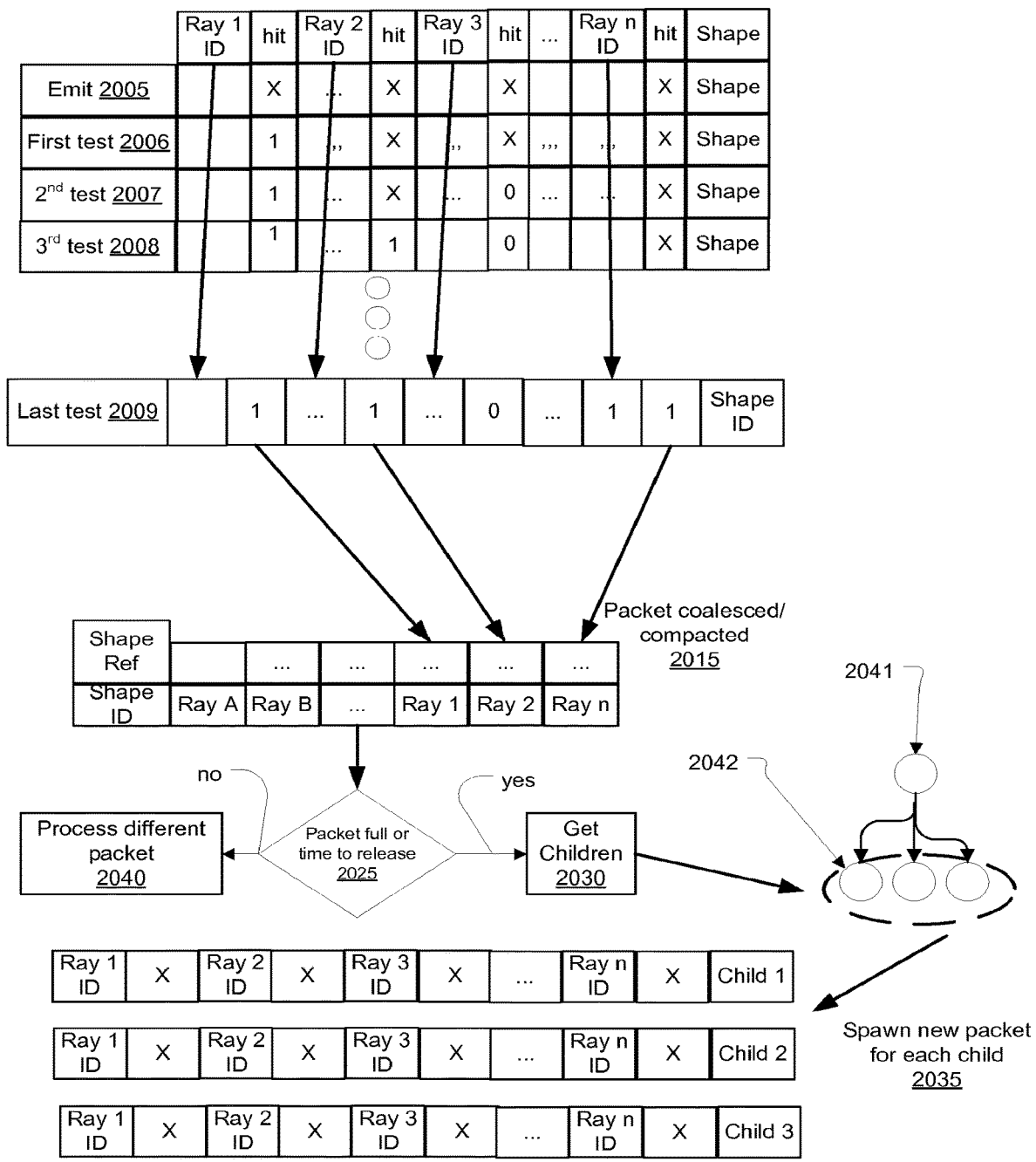
FIG. 20 illustrates method steps, in the context of data structures, generally applicable in systems according to previous figures.

FIG. 20 is for explaining some examples of how methods according the described aspects can be implemented. A packet is emitted 2005 with shape information, ray IDs and locations where hit information can be written back, the hit information can be zero'ed or otherwise a "don't care" at this point. A first test is conducted 2006 for ray 1 ID, and found to hit, so a 1 is written to the packet, the packet is passed for a second test 2007, where ray 3 was found to be localized for the second test, and it was found to have missed, so a 0 is written (or maintained), the hit information from test 2006 is carried forward in the packet (i.e., rays in the packet can be tested out of order). A third test 2008 is conducted, for ray 2, and found to hit. This example shows that rays in a packet can be tested out of an order presented in the packet, and an order of testing depends on what tester was best able to access ray data for a given ray ID. Testing continues (2009) until all ray IDs have been tested. Then, the packet can be coalesced 2015, meaning that only hit information needs to be maintained. Such coalescing can occur at a compute resource that emitted the packet. New hit results can be combined with hit results from a previously existing packet (see FIG. 19). Then, it can be determined 2025 whether the collection of rays in the packet is ready to test (e.g., based on fullness). If not, then a different packet can be processed 2040. If so, then child shapes of the shape associated with the packet can be fetched 2030, where parent node 2041 is the shape and children of that node are identified by 2042, for example. Then, new packets can be spawned 2035 for each child shape with ray identifiers from the packet associated with the parent.

Figure 21:
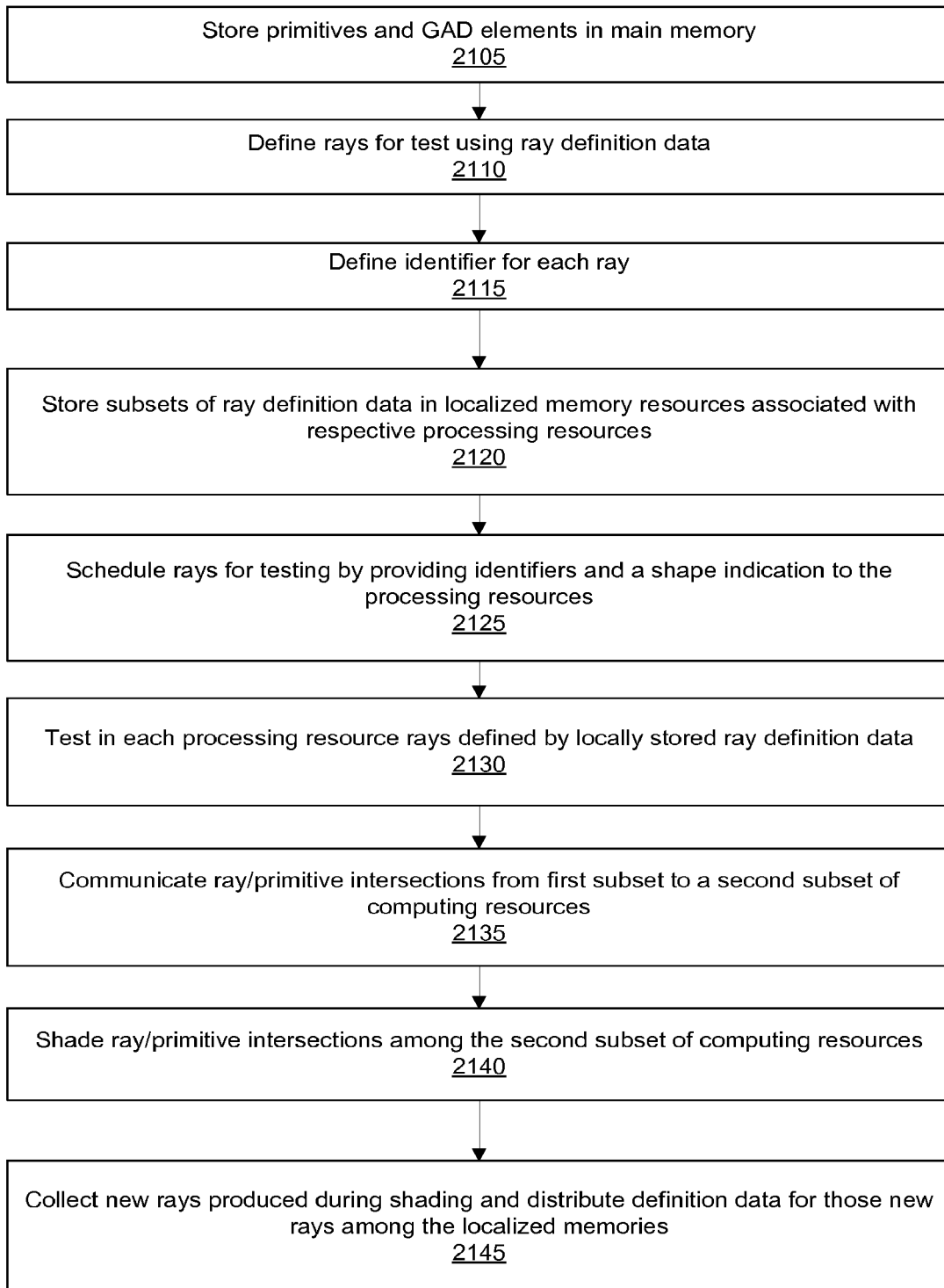
FIG. 21 illustrates further method aspects according to this disclosure.

FIG. 21 helps summarize method aspects described above, in the context of systems that can be used to implement them. In particular, FIG. 21 depicts that method 2100 comprises storing primitives and GAD elements in a main memory (2105), and defining (2110) rays for intersection testing using ray definition data (e.g., origin and direction information). Each ray is made identifiable with an identifier (2115). Subsets of the ray definition data is stored (2120) in localized memories associated with respective processing resources of a plurality of such resources. Rays are scheduled for testing by distributing (2125) identifiers for those rays, and shape data among the processing resources. The rays are tested in processing resources that have definition data for those rays stored locally (2130). In some situations, each ray may have definition data in only one local memory.

Indications of intersections between rays and primitives are communicated (2135) from the first subset of computing resources to the second. The second subset shades (2140) the intersections. The shading can result in new rays, for which definition data is distributed 2145 among the localized memories, preferably replacing definition data for completed rays. Those rays are then tested as above. The subsets of computing resources can be implemented by instantiating or otherwise allocating computing resources, which includes instantiating threads for executing on multithreaded processors or cores. The allocation can vary over time, and need not be a static allocation between resources for intersection testing and for shading. For example, a core executing a thread of intersection testing can complete a series of intersection tests, filling a memory space with a number of indications of ray intersections with primitives, then the core can switch to shading those intersections.

Some examples above were explained primarily from the perspective of testing GAD elements for intersection, where results of such testing is grouping of rays (via association of ray IDs with particular GAD elements) against smaller and smaller groupings of primitives. It was disclosed that ultimately, a GAD element identified by testing will bound primitives that are to be tested against rays identified as being part of a group associated with that GAD element. For packets having primitives, the outcome of intersection testing is identifications of ray/primitive intersections, which are accounted for by tracking at least the closest such intersection detected for a given ray, usually with other data defining the ray (for convenience).

Then, after a given ray has been tested against the entirety of the scene, a closest detected intersection, if any, for each ray can be returned with the ray ID to an application or a driver or another process that can use such results for initiating shading processes. The ray identifiers can be returned via a queuing strategy, such as those according to the various examples herein (i.e., it is not necessary to specify what compute resource will be executing shading code for a particular intersection, nor does a particular intersection testing resource have its detected intersections tested by a predetermined shading resource). In some intersection tests, barycentric coordinates are calculated for intersection testing, and these coordinates can be made available for shading, if desired. This is an example of other data that can be transmitted from intersection testers to shaders.

Generally, any of the functions, features, and other logic described herein can be implemented with a variety of computing resources. A computing resource can be a thread, a core, a processor, a fixed function processing element, and the like. Also, other functions, such as collection or packet management can be provided or implemented as a process, thread or task that can be localized to one computing resource or distributed among a plurality of computing resources (e.g., a plurality of threads distributed among a plurality of physical compute resources). The task essentially comprises identifying packets in flight that have intersection test results for the shape having a collection managed by that computing resource.

Likewise, computing resources being used for intersection testing can also host other processes, such as shading processes that are used to shade intersections detected. For example, a processor that executes intersection testing also can execute shading threads. For example, in a ring bus implementation, if the queue for one processing resource does not currently have any packets for intersection testing then data processing resource can instead start a thread for shading previously identified intersections. A principal difference being that there is no requirement or general relationship between having an intersection test thread on a given processor also run a shading thread for a ray intersection detected by that thread. Instead, queued ray/primitive intersections provide ray inputs for shading threads, and thus the mapping between intersection testing resources and shading resources can be any to any, such that different hardware units or software units can intersection test and shade for the same ray.

Likewise, the various queues and other interfaces intermediating communication among different functions (e.g., between intersection testing resources and between intersection testing and shading) can be implemented in one or more memories according to any of a variety of buffering strategies that can be selected based on considerations relating to the physical resources available for implementing them. Queues can be controlled by an originating resource, or by a destination resource. In other words, a destination can be listening for data on a shared bus and can take data it needs, or data can be addressed to it, via memory mapping, direct communication, or the like.

By further example, if a core can support multithreading, then a thread can be dedicated to shading while another thread can be dedicated to intersection processing. Care would have to be taken however, to avoid cache incoherency resulting from fetching textures and other shading information at the expense of maintaining ray data, which remains a priority for cache allocation for intersection testing resources.

Since it is contemplated that an advantage of this architecture is that caching requirements for shape data are reduced, cache coherency considerations for that kind of data are reduced. In fact, in some implementations little effort may need to be spent on keeping certain shape data available, or on predicting when shape data will be used again. Instead, when a given packet of ray IDs is ready for testing, shape data for those packet(s) can be obtained from the fastest memory then storing it, and generally, existing workloads of processing other packets will shield any latency incurred in such fetching. After testing those shapes for intersection, the shape data can be allowed to be overwritten.

Any of the queues identified herein can be implemented in shared memory resources, in SRAMs, as linked lists, circulation buffers, memory sequential or striped memory locations, or in any other functional form known in the art for a queue. Queues can operate to maintain an ordering of packets, such that a packet first arriving will be first to exit, but that is not a requirement. In some examples, each computing resource may be provided with an ability to examine a given number of packets in its queue to determine whether or not it may be advantageous to process the packets out of order. Such an implementation would be more complex than an in-order system, but can be provided as desired.

Computer-executable instructions comprise, for example, instructions and data which cause or otherwise configure a general purpose computer, special purpose computer, or special purpose processing device to perform a certain function or group of functions. The computer executable instructions may be, for example, binaries, intermediate format instructions such as assembly language, or source code. Although some subject matter may have been described in language specific to examples of structural features and/or method steps, it is to be understood that the subject matter defined in the appended claims is not necessarily limited to these described features or acts. Rather, the described features and steps are disclosed as examples of components of systems and methods within the scope of the appended claims.

Above, various examples of computing hardware and/or software programming were explained, as well as examples how such hardware/software can intercommunicate. These examples of hardware or hardware configured with software and such communications interfaces provide means for accomplishing the functions attributed to each of them. For example, a means for intersection testing according to some examples herein can comprise any of the following (1) a plurality of independently operable computing resources, each having a localized store of ray definition data, and operable to test ray(s) for intersection with shapes in response to being provided an identifier for those ray(s) and shape data.

For example, a means for managing collections of rays comprises a computing resource configured with programming, or an FPGA or an ASIC, or a portion thereof, that implements tracking of groups of ray identifiers and associates groups with elements of acceleration data, and which can cause, or provide information for causing formation of a packet with the ray identifiers and either a reference to a shape or shape data determined by the shape associated with the group of ray identifiers.

For example, a function described above includes communicating identifiers for rays that have completed intersection testing and intersected a primitive, through a queue, for processing in computing resources configured for shading those intersections. Means for implementing this function can comprise a hardware queue, or shared memory space organized as a queue or list, such as memory configured as a ring buffer, or as a linked list, or the like. The means thus can include programming and/or logic that causes a ray identifier and a primitive identifier to be obtained from a next or a specified slot in a queue or a location in memory. A controller can manage the queue or memory to maintain a next read position and a next write position for outgoing and incoming ray and primitive identifiers. Such queuing means also can be used to interface intersection testing resources together when those resources pass packets of ray identifiers and shape data to each other. Such queuing means also can be used to receive ray identifiers for new rays awaiting commencement of intersection testing. Thus, each such more specific queuing function can be implemented by these means or their equivalents.

For example, a function described above includes shading identified intersections between rays and primitives. This function can be implemented by means comprising computing hardware configured with programming associated with intersected primitives. The programming can cause the computing hardware to obtain data such as textures, procedural geometry modifications and so on to determine what other information is required to determine what effect that primitive has on light hitting it. The programming can cause emission of new rays to be further intersection tested (e.g., shadow, refraction, reflection rays). The programming can interface with an application programming interface for causing emission of such rays. The rays as defined by the shading programming can comprise origin and direction definition information, and a controller can determine ray identifiers for such defined rays. Fixed function hardware can be used to implement portions of such functionality. However, it is preferred to allow programmable shading using computing resources that can be configured according to code associated with intersected primitives and/or other code as desirable or necessary.

For example, another function described above was maintaining a master list of rays being tested for intersection and/or awaiting intersection testing, and distributing subsets of these master rays among distributed cache memories that are associated with means for intersection testing. Such a function can be implemented with means comprising a processor or group of processors that can use an integrated or separate memory controller to interface with a memory for storing data under the control of programming implementing those functions. Such programming can be included at least partially in a driver associated with or otherwise controlling intersection testing functionality.

Aspects of functions, and methods described and/or claimed may be implemented in a special purpose or general-purpose computer including computer hardware, as discussed in greater detail below. Such hardware, firmware and software can also be embodied on a video card or other external or internal computer system peripherals. Various functionality can be provided in customized FPGAs or ASICs or other configurable processors, while some functionality can be provided in a management or host processor. Such processing functionality may be used in personal computers, desktop computers, laptop computers, message processors, hand-held devices, multi-processor systems, microprocessor-based or programmable consumer electronics, game consoles, network PCs, minicomputers, mainframe computers, mobile telephones, PDAs, pagers, and the like.

Further, communication links and other data flow constructs shown in the figures, such as links 112, 121, and 118 of FIG. 1, and similar links in other figures can be implemented in a variety of ways depending on the implementation of the functions identified. For example, if intersection testing unit 109 comprises a plurality of threads executing on one or more CPUs, then link 118 can comprise physical memory access resources of such CPU(s) and appropriate memory controller hardware/firmware/software to provide access to ray data storage 105. By further example, if intersection testing region 140 were on a graphics card connected by a PCI Express bus to host 140, then links 121 and 112 would be implemented using the PCI Express bus.

Intersection testing as described herein will generally exist in the context of larger systems and components of systems. For example, processing can be distributed over networks, such as local or wide area networks and may otherwise be implemented using peer to peer technologies and the like. Division of tasks can be determined based on a desired performance of the product or system, a desired price point, or some combination thereof. In embodiments implementing any of the described units at least partially in software, computer-executable instructions representing unit functionality can be stored on computer-readable media, such as, for example, magnetic or optical disks, flash memory, USB devices, or in networks of storage devices such as NAS or SAN equipment, and the like. Other pertinent information, such as data for processing can also be stored on such media.

Also, in some cases terminology has been used herein because it is considered to more reasonably convey salient points to a person of ordinary skill, but such terminology should not be considered to impliedly limit a range of implementations encompassed by disclosed examples and other aspects. For example, a ray is sometimes referred to as having an origin and direction, and each of these separate items can be viewed, for understanding aspects of the disclosure, as being represented respectively as a point in 3-D space and a direction vector in 3-D space. However, any of a variety of other ways to represent a ray can be provided, while remaining within the present disclosures. For example, a ray direction also can be represented in spherical coordinates. It also would be understood that data provided in one format can be transformed or mapped into another format, while maintaining the significance of the information of the data originally represented.

Also, a number of examples have been illustrated and described in the preceding disclosure, each illustrating different aspects that can be embodied systems, methods, and computer executable instructions stored on computer readable media according to the following claims. By necessity, not every example can illustrate every aspect, and the examples do not illustrate exclusive compositions of such aspects. Instead, aspects illustrated and described with respect to one figure or example can be used or combined with aspects illustrated and described with respect to other figures. As such, a person of ordinary skill would understand from these disclosures that the above disclosure is not limiting as to constituency of embodiments according to the claims, and rather the scope of the claims define the breadth and scope of inventive embodiments herein.

What is claimed is:

1. A computer-implemented method of rendering a scene by performing ray tracing, said performing ray tracing comprising tracing primary rays through the scene to render the scene in an immersive virtual reality system, wherein the origin of each of the primary rays is based on a viewpoint from which the scene is to be rendered, the method of performing ray tracing comprising:
    performing, at one or more processing units, intersection testing of primary rays against shapes to generate intersection test results, wherein said performing intersection testing comprises performing a first subset of intersection tests by testing in parallel, in each respective processing unit, a respective different ray with a single shape and subsequently performing a second subset of intersection tests by testing in parallel, in each respective processing unit, a respective different ray with a second single shape; and
    using said intersection test results generated from intersection testing of primary rays to render the scene from said viewpoint in the immersive virtual reality system.

2. The computer-implemented method according to claim 1 wherein the scene is a real-world scene.

3. The computer-implemented method according to claim 1 wherein the scene comprises some physical objects of a real-world scene and some computer generated objects.

4. The computer-implemented method according to claim 1 wherein the scene is entirely computer generated.

5. The computer-implemented method according to claim 1, wherein performing intersection testing comprises performing a first subset of intersection tests by testing, in each of the one or more processing units, a single ray with a respective different shape of a plurality of shapes.

6. The computer-implemented method according to claim 5, wherein performing intersection testing comprises performing, subsequent to performing the first subset of intersection tests, a second subset of intersection tests by testing a different second ray with a respective different shape of the plurality of shapes.

7. The computer-implemented method according to claim 1, wherein the method further comprises receiving, at the computing resource, ray data for a plurality of rays to be intersection tested and shape data for a plurality of shapes against which the rays are to be tested.

8. The computer-implemented method according to claim 7, wherein receiving the ray data and the shape data comprises receiving a packet comprising the ray data and the shape data.

9. The computer-implemented method according to claim 7, wherein the ray data comprises a plurality of ray identifiers that each identify a respective ray to be tested; and wherein the shape data comprises at least one of (i) an identifier for each shape of one or more shapes against which the rays are to be tested, and (ii) an identifier for a beginning of a strip of one or more shapes against which the rays are to be tested.

10. The computer-implemented method according to claim 1, wherein the method further comprises forming at least one packet comprising intersection test results.

11. The computer-implemented method according to claim 10, wherein forming at least one packet comprises formatting the intersection test results into a plurality of packets, wherein each packet comprises the intersection test results for a particular shape of a plurality of shapes.

12. The computer-implemented method according to claim 10, wherein forming a packet comprises forming a packet comprising at least one separate bit indicating the result of a specific intersection test.

13. The computer-implemented method according to claim 7, further comprising retrieving ray origin and ray direction data for the plurality of rays and storing the retrieved ray origin and ray direction data in local storage for accessing the one or more processing units.

14. The computer-implemented method of claim 1 wherein said performing ray tracing further comprises tracing secondary rays through the scene, wherein the origin of a secondary ray is based on an intersection point of an intersection involving a previously traced ray.

15. The computer-implemented method according to claim 1 wherein the one or more processing units comprise a plurality of single-instruction multiple data (SIMD) computation units for performing the intersection testing.

16. The computer-implemented method according to claim 1 wherein said intersection testing is performed in parallel to generate multiple intersection test results concurrently.

17. A ray tracing system for rendering a scene by performing ray tracing, said performing ray tracing comprising tracing primary rays through the scene to render the scene in an immersive virtual reality system, wherein the origin of each of the primary rays is based on a viewpoint from which the scene is to be rendered, the ray tracing system comprising one or more processing units, wherein the ray tracing system is configured to:
    perform, at the one or more processing units, intersection testing of primary rays against shapes to generate intersection test results, wherein said intersection testing comprises performing a first subset of intersection tests by testing in parallel, in each respective processing unit, a respective different ray with a single shape and subsequently performing a second subset of intersection tests by testing in parallel, in each respective processing unit, a respective different ray with a second single shape; and
    use said intersection test results generated from intersection testing of primary rays to render the scene from said viewpoint in the immersive virtual reality system.

18. An immersive virtual reality system comprising a ray tracing system configured to render a scene by performing ray tracing, wherein said performing ray tracing comprises tracing primary rays through the scene to render the scene in an immersive virtual reality system, wherein the origin of each of the primary rays is based on a viewpoint from which the scene is to be rendered, the ray tracing system comprising one or more processing units, wherein the ray tracing system is configured to:
    perform, at the one or more processing units, intersection testing of primary rays against shapes to generate intersection test results, wherein said intersection testing comprises performing a first subset of intersection tests by testing in parallel, in each respective processing unit, a respective different ray with a single shape and subsequently performing a second subset of intersection tests by testing in parallel, in each respective processing unit, a respective different ray with a second single shape; and use said intersection test results generated from intersection testing of primary rays to render the scene from the viewpoint in the immersive virtual reality system.

\* \* \* \* \*